(12) United States Patent
Tateishi et al.

(10) Patent No.: US 8,172,910 B2
(45) Date of Patent: *May 8, 2012

(54) AZO PIGMENT, PROCESS FOR PRODUCING AZO PIGMENT, AND DISPERSION AND COLORING COMPOSITION CONTAINING AZO PIGMENT

(75) Inventors: Keiichi Tateishi, Kanagawa (JP); Shinya Hayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/121,513

(22) PCT Filed: Sep. 28, 2009

(86) PCT No.: PCT/JP2009/066822
§ 371 (c)(1),
(2), (4) Date: Mar. 29, 2011

(87) PCT Pub. No.: WO2010/035845
PCT Pub. Date: Apr. 1, 2010

(65) Prior Publication Data
US 2011/0179974 A1 Jul. 28, 2011

(30) Foreign Application Priority Data

Sep. 29, 2008 (JP) .................. 2008-251880
Sep. 29, 2008 (JP) .................. 2008-251881
Sep. 29, 2008 (JP) .................. 2008-251882
Sep. 28, 2009 (JP) .................. 2009-223193

(51) Int. Cl.
*A61Q 5/10* (2006.01)
*C09D 11/00* (2006.01)

(52) U.S. Cl. ...... 8/637.1; 8/639; 8/690; 8/692; 106/31.6

(58) Field of Classification Search .................. 8/637.1, 8/639, 690, 692; 106/31.6
See application file for complete search history.

(56) References Cited

U.S. PATENT DOCUMENTS 4,579,949 A  4/1986  Rochat et al.
(Continued)

FOREIGN PATENT DOCUMENTS

JP 58-210084 A 12/1983
(Continued)

OTHER PUBLICATIONS

STIC Search Report dated Aug. 1, 2011.*
(Continued)

*Primary Examiner* — Eisa Elhilo
(74) *Attorney, Agent, or Firm* — Sughrue Mion, PLLC

(57) ABSTRACT

An object of the invention is to provide an azo pigment having extremely good dispersibility and dispersion stability and having excellent hue and tinctorial strength and, preferably, having a long axis observed with a transmission microscope of from 0.01 μm to 30 μm. An azo pigment which is represented by the following formula (1) and having characteristic peaks at Bragg angles (2θ±0.2°) of (i) 7.6° and 25.6°, (ii) 7.0°, 26.4°, and 27.3°, or (iii) 6.4°, 26.4°, and 27.2° in X-ray diffraction with characteristic Cu Kα line, or a tautomer thereof:

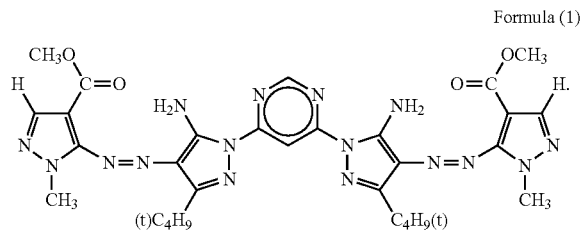

Formula (1)

9 Claims, 6 Drawing Sheets

U.S. PATENT DOCUMENTS

2008/0058531 A1 3/2008 Schmidt et al.
2008/0274283 A1* 11/2008 Tateishi et al. ............... 427/256

FOREIGN PATENT DOCUMENTS

| JP | 05-222314 A | 8/1993 |
| JP | 08-048908 A | 2/1996 |
| JP | 2007-063520 A | 3/2007 |
| WO | 2009/005137 A2 | 1/2009 |
| WO | 2009/110557 A1 | 9/2009 |
| WO | 2009/110643 A1 | 9/2009 |

OTHER PUBLICATIONS

International Search Report, dated Dec. 1, 2009, issued in Application No. PCT/JP2009/066822.

Written Opinion, dated Dec. 1, 2009, issued in Application No. PCT/JP2009/066822.

* cited by examiner

AZO PIGMENT, PROCESS FOR PRODUCING AZO PIGMENT, AND DISPERSION AND COLORING COMPOSITION CONTAINING AZO PIGMENT

TECHNICAL FIELD

The present invention relates to an azo pigment, a process for producing an azo pigment, and a dispersion and coloring composition containing an azo pigment.

BACKGROUND ART

In recent years, as image-recording materials, materials for forming color images have been predominant and, specifically, recording materials for an ink jet system, recording materials for a thermal transfer system, recording materials for an electro-photographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular interaction, both of them are in a trade-off relation with each other, thus being difficult to allow them to be compatible with each other. Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good yellow hue and is fast to light, moist heat, and active gases in the environment, particularly for a pigment having high tinctorial strength and is fast against light.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant molecule. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than 1/10 of the number of dyes.

Azo pigments are particularly high in brightness and excellent in light fastness and heat resistance, and hence they have widely been used in printing inks, ink for an inkjet system, electro-photographic materials, and pigments for a color filter. And, with expansion of use, pigments have been required to have more sufficient color density, more sufficient stability of dispersion, more improvement of color reproducibility, more sufficient dispersibility and dispersion stability, and higher stability with time in a medium in which they are used than the levels of commonly used ones used in printing inks, gravure inks, and coloring materials.

On the other hand, many of typical organic pigments are polymorphic and, in spite of having the same chemical formulation, such pigments are known to take two or more crystal forms.

Of organic pigments, some organic pigments such as azo pigments can form fine and size distribution-controlled particles by selecting appropriate reaction conditions upon synthesis thereof, and there are pigments such as copper phthalocyanine green which are formed into pigments by allowing extremely fine and aggregated particles produced upon synthesis to grow in a subsequent step with size distribution being controlled, and pigments such as copper phthalocyanine blue pigment which are formed into pigments by pulverizing coarse and uneven particles produced upon synthesis in a subsequent step and controlling the size distribution. For example, a diketopyrrolopyrrole pigment is generally synthesized by reacting a succinic diester with an aromatic nitrile in an organic solvent (for example, patent document 1). The crude diketopyrrolopyrrole pigment is heat-treated in water or in an organic solvent, and then subjected to pulverization such as wet milling into a form appropriate for use (see, for example, patent document 2). With C.I. Pigment Red 254, an α-type crystal form and a n-type crystal form are known (see, for example, patent document 3). Also, with an azo pigment of C.I. Pigment Yellow 181, several crystal forms are known (see, for example, patent document 4).

Patent document 1: JP-A-58-210084
Patent document 2: JP-A-5-222314
Patent document 3: JP-A-8-48908
Patent document 4: US Patent Application Publication No. 2008/0058531

DISCLOSURE OF THE INVENTION

Problems that the Invention is to Solve

The present invention relates to an azo pigment wherein pyrazole rings each having a specific substituent are connected to each other through azo groups and a pyrimidine ring and which has a novel crystal form, with the excellent stability and production process thereof not having been known so far.

In a first embodiment of the invention, an object of the invention is to provide an azo pigment having extremely good dispersibility and dispersion stability and having excellent hue and tinctorial strength.

In a second embodiment, an object of the invention is to provide an azo pigment having extremely good pigment dispersion stability and ink liquid stability and, in particular, having excellent tinctorial strength.

In a third embodiment, an object of the invention is to provide an azo pigment which produces a printed product with sufficient density, which provides a dispersion with excellent stability, which shows excellent color reproducibility in a color-mixing portion of red, green, etc., which has excellent hue and tinctorial strength, and which has extremely good solvent resistance.

Also, a further object of the invention is to provide a process for producing the azo pigment, which enables production of the azo pigment with good reproducibility and high efficiency while controlling so as to obtain specific structural isomerization and crystal polymorphism.

A still further object of the invention is to provide a dispersion containing the azo pigment.

A yet further object of the invention is to provide a coloring composition containing the dispersion containing the azo pigment.

Means for Solving the Problem

As a result of intensive investigations in consideration of the above-mentioned circumstances, the inventors have found in the first embodiment that an azo pigment having characteristic X ray diffraction peaks at specific positions has extremely good dispersibility and dispersion stability and has excellent hue and tinctorial strength. Also, the inventors have found that a coloring composition containing dispersed therein the pigment enables to produce an ink for inkjet recording which has excellent hue and tinctorial strength.

As a result of intensive investigations in consideration of the above-mentioned circumstances, the inventors have found in the second embodiment that an azo pigment having characteristic X ray diffraction peaks at specific positions has excellent hue, good pigment dispersion stability and ink liquid stability with excellent stability with time with respect to particle size of the pigment and, in particular, has excellent tinctorial strength. Also, the inventors have found that a coloring composition containing dispersed therein the pigment enables to produce an ink for inkjet recording which has particularly excellent tinctorial strength of, for example, providing high optical density upon printing by inkjet recording or the like at high speed.

As a result of intensive investigations in consideration of the above-mentioned circumstances, the inventors have found in the third embodiment that an azo pigment having characteristic X ray diffraction peaks at specific positions produces printed products having sufficient density, shows good storage stability in a dispersion form, has excellent color reproducibility in a color-mixing portion of red, green, etc., has excellent hue and tinctorial strength, and has extremely good solvent resistance. Also, the inventors have found that a coloring composition containing dispersed therein the pigment enables to produce an ink for inkjet recording which has excellent hue and tinctorial strength.

Further, the inventors have found a process for producing an azo pigment with good reproducibility and high efficiency while controlling so as to obtain specific structural isomerization and crystal polymorphism, thus having completed the invention.

That is, the invention is as follows.

<1> An azo pigment represented by the following formula (1), which has characteristic peaks at Bragg angles) (2θ±0.2°) of 7.6° and 25.6° in X-ray diffraction with characteristic Cu Kα line, or a tautomer thereof.

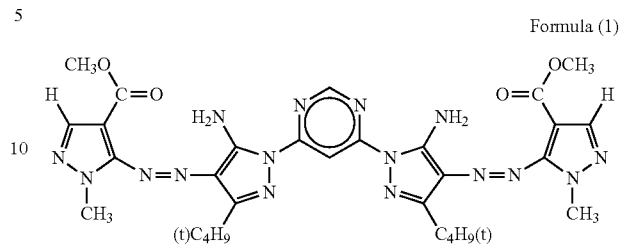

Formula (1)

<2> An azo pigment represented by the following formula (1), which has characteristic peaks at Bragg angles) (2θ±0.2°) of 7.0°, 26.4° and 27.3° in X-ray diffraction with characteristic Cu Kα line, or a tautomer thereof.

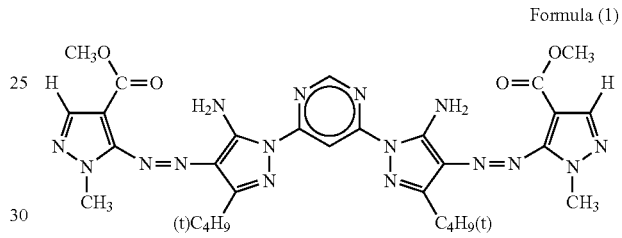

Formula (1)

<3> An azo pigment represented by the following formula (1), which has characteristic peaks at Bragg angles) (2θ±0.2°) of 6.4°, 26.4° and 27.2° in X-ray diffraction with characteristic Cu Kα line, or a tautomer thereof

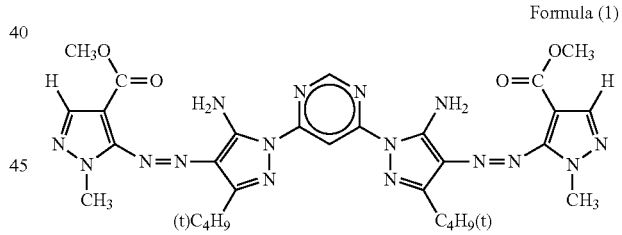

Formula (1)

<4> A process for producing an azo pigment represented by the following formula (1) or a tautomer thereof, having: conducting diazo coupling reaction between a diazonium salt derived from a heterocyclic amine represented by the following formula (2) and a compound represented by the following formula (3).

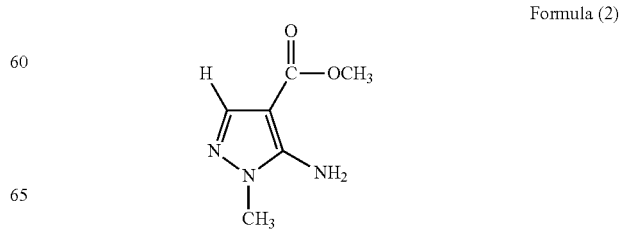

Formula (2)

-continued

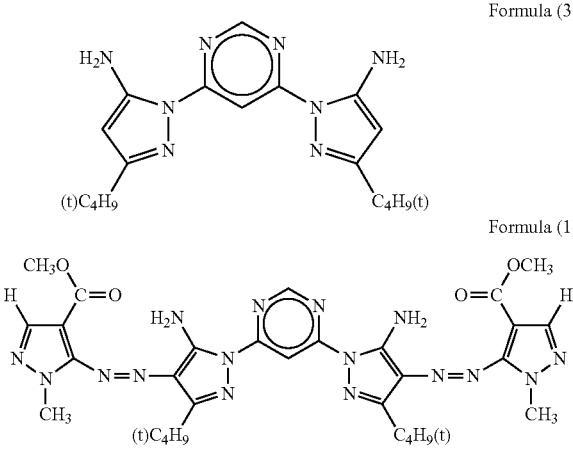

Formula (3)

Formula (1)

<5> The production process according to <4>, further having successively conducting after-treatment without isolating the azo pigment obtained by the production process according to <4>.
<6> The azo pigment according to any one of <1> to <3>, which is produced by the production process of <4> or <5>.
<7> A pigment dispersion which has the azo pigment according to any one of <1> to <3> and <6>.
<8> The pigment dispersion according to <7>, wherein the azo pigment has a volume-average particle size of from 0.01 µm to 0.1 µm.
<9> A coloring composition having the azo pigment according to any one of <1> to <3> and <6>, or the pigment dispersion according to <7> or <8>.

Advantages of the Invention

According to the present invention, there is provided an azo pigment having excellent coloring characteristics such as tinctorial strength and hue and having excellent dispersibility and dispersion stability. A pigment dispersion having excellent coloring characteristics, dispersibility, and dispersion stability can be obtained by dispersing the pigment of the invention in various media. The pigment dispersion can be used for, for example, an ink for printing such as inkjet printing, a color toner for electrophotography, a display such as LCD or PDP, a color filter to be used in photographing equipment such as CCD, a paint, and a colored plastic.

MODE FOR CARRYING OUT THE INVENTION

Figure 1:
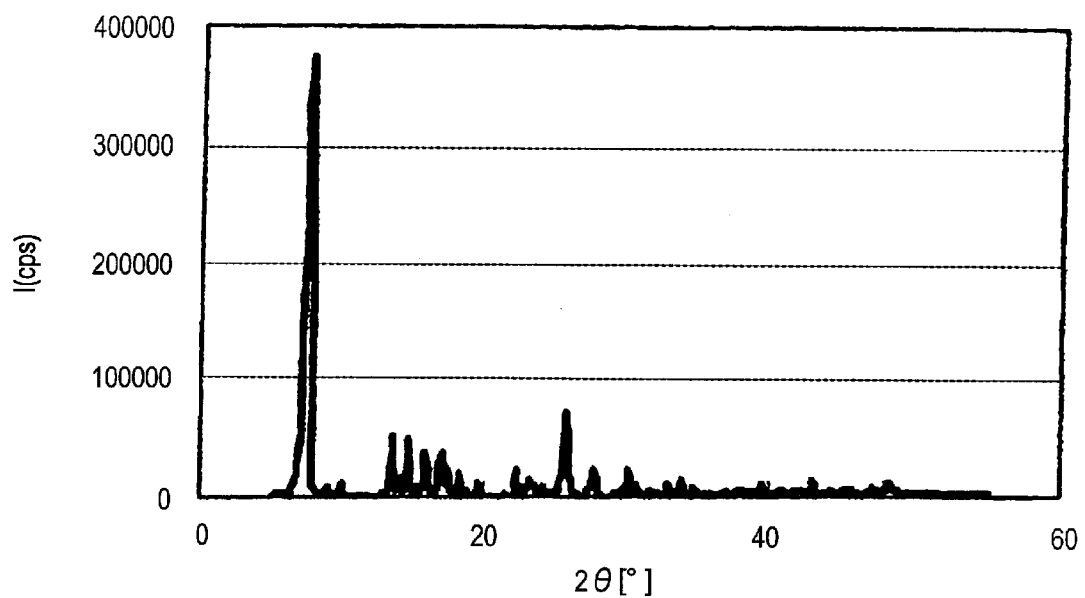
FIG. 1 is an X-ray diffraction pattern of an α-type crystal form azo pigment (1)-1 synthesized according to Synthesis Example 1-1.

The present invention will be described in detail below.
The azo pigment in the first embodiment of the invention is an azo pigment represented by the following formula (1) and having characteristic peaks at Bragg angles) (2θ±0.2°) of 7.6° and 25.6° in X-ray diffraction with characteristic Cu Kα line, or a tautomer thereof.

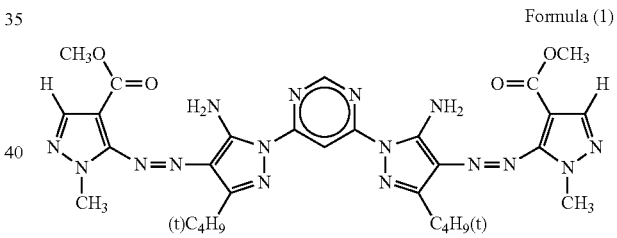

Formula (1)

The azo pigment in the second embodiment of the invention is an azo pigment represented by the following formula (1) and having characteristic peaks at Bragg angles) (2θ±0.2°) of 7.0°, 26.4°, and 27.3° in X-ray diffraction with characteristic Cu Kα line, or a tautomer thereof.

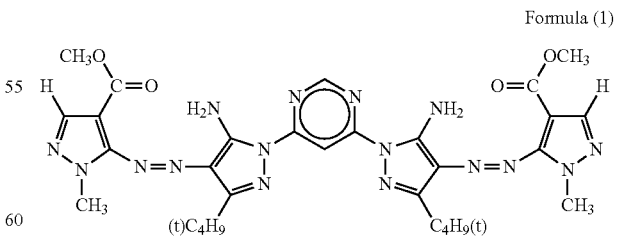

Formula (1)

The azo pigment in the third embodiment of the invention is an azo pigment represented by the following formula (1) and having characteristic peaks at Bragg angles) (2θ±0.2°) of 6.4°, 26.4°, and 27.2° in X-ray diffraction with characteristic Cu Kα line, or a tautomer thereof.

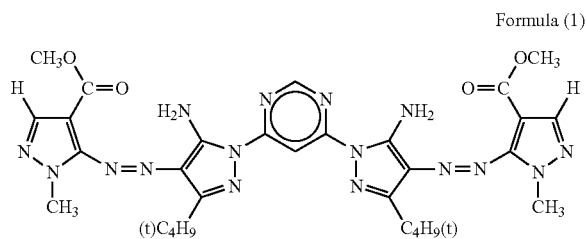

Formula (1)

In this specification, the azo pigment represented by the above formula (1) and having characteristic peaks at Bragg angles) (2θ±0.2°) of 7.6° and 25.6° in X-ray diffraction with characteristic Cu Kα line will be hereinafter referred to as α-type crystal form azo pigment.

The azo pigment represented by the above formula (1) and having characteristic peaks at Bragg angles) (2θ±0.2°) of 7.0°, 26.4°, and 27.3° in X-ray diffraction with characteristic Cu Kα line will be hereinafter referred to as β-type crystal form azo pigment.

The azo pigment represented by the above formula (1) and having characteristic peaks at Bragg angles) (2θ±0.2°) of 6.4°, 26.4°, and 27.2° in X-ray diffraction with characteristic Cu Kα line will be hereinafter referred to as γ-type crystal form azo pigment.

In the invention, the measurement of X-ray diffraction of the α-type, β-type, and γ-type crystal form azo pigments represented by the above formula (1) is conducted according to Japanese Industrial Standards JISK0131 (General Rule of X-ray diffractiometry) using a powder X-ray diffractometer, RINT 2500 (manufactured by Rigaku Industrial Corp.).

In the case where the azo pigment is in a single crystal form, distance between molecules is so close that intermolecular action becomes strong. As a result, the pigment shows an increased solvent resistance, an increased heat stability, an increased light fastness, an increased resistance to gases, and an increased print density and, further, an expanded color reproducible region. Therefore, the azo pigment represented by the formula (1) and the tautomer thereof are preferably in a crystal form having characteristic X-ray diffraction peaks at Bragg angles) (2θ±0.2°) of 7.6° and 25.6°, 7.0°, 26.4°, and 27.3°, or 6.4°, 26.4°, and 27.2° with characteristic Cu Kα line.

The crystal form having characteristic X-ray diffraction peaks at 7.6° and 25.6° is more preferably a crystal form having characteristic X-ray diffraction peaks at 7.6°, 13.5°, 25.6°, and 27.7°. Of the crystal forms, a crystal form having characteristic X-ray diffraction peaks at 7.6°, 13.5°, 15.9°, 16.9°, 25.6°, and 27.7° is most preferred.

The crystal form having characteristic X-ray diffraction peaks at 7.0°, 26.4°, and 27.3° is more preferably a crystal form having characteristic X-ray diffraction peaks at 7.0°, 18.4°, 26.4°, and 27.3°. Of the crystal forms, a crystal form having characteristic X-ray diffraction peaks at 7.0°, 13.2°, 14.9°, 18.4°, 26.4°, and 27.3° is most preferred.

The crystal form having characteristic X-ray diffraction peaks at 6.4°, 26.4°, and 27.2° is more preferably a crystal form having characteristic X-ray diffraction peaks at 6.4°, 12.7°, 14.6°, 26.4°, and 27.2°. Of the crystal forms, a crystal form having characteristic X-ray diffraction peaks at 6.4°, 8.9°, 12.7°, 14.6°, 18.1°, 26.4°, and 27.2° is most preferred.

In view of hue, with respect to the crystal form having characteristic X-ray diffraction peaks at 7.6° and 25.6°, the peak height at a Bragg angle) (2θ±0.2°) of 6.4° in X-ray diffraction with characteristic Cu Kα line is preferably more than 0.00001 when the peak height at 7.6° is taken as 1, since greenish yellow to reddish tone increases to improve tinctorial strength. Also, the peak height at 6.4° is preferably less than 0.2 in view of color reproducibility with respect to hue, since it serves to suppress excessively reddish tone. Therefore, the peak height at a Bragg angle) (2θ±0.2°) of 6.4° in X-ray diffraction with characteristic Cu Kα line is preferably not less than 0.00001 and not more than 0.2, more preferably not less than 0.0001 and not more than 0.1, most preferably not less than 0.0001 and not more than 0.05, when the peak height at 7.6° is taken as 1.

In view of hue, with respect to the crystal form having characteristic X-ray diffraction peaks at 7.0°, 26.4°, and 27.3°, the peak height at a Bragg angle) (2θ±0.2°) of 7.6° in X-ray diffraction with characteristic Cu Kα line is preferably more than 0.00001 when the peak height at 7.0° is taken as 1, since reddish tone decreases to improve color reproducibility. Also, the peak height at 7.6° is preferably less than 0.2 in view of tinctorial strength with respect to hue, since it serves to increase reddish tone. Therefore, the peak height at a Bragg angle) (2θ±0.2°) of 7.6° in X-ray diffraction with characteristic Cu Kα line is preferably not less than 0.00001 and not more than 0.2, more preferably not less than 0.0001 and not more than 0.1, most preferably not less than 0.0001 and not more than 0.05, when the peak height at 7.0° is taken as 1.

In view of hue, with respect to the crystal form having characteristic X-ray diffraction peaks at 6.4°, 26.4°, and 27.2°, the peak height at a Bragg angle) (2θ±0.2°) of 7.6° in X-ray diffraction with characteristic Cu Kα line is preferably more than 0.00001 when the peak height at 6.4° is taken as 1, since reddish tone decreases to improve color reproducibility. Also, the peak height at 7.6° is preferably less than 0.2, since it serves to reduce solvent resistance. Therefore, the peak height at a Bragg angle) (2θ±0.2°) of 7.6° in X-ray diffraction with characteristic Cu Kα line is preferably not less than 0.00001 and not more than 0.2, more preferably not less than 0.0001 and not more than 0.1, most preferably not less than 0.0001 and not more than 0.05, when the peak height at 6.4° is taken as 1.

In case when the length of the long axis of the primary particles observed under a transmission microscope is 0.01 μm or less, fastness to light or to ozone might be seriously reduced in some cases, or there might result poor dispersibility in some cases due to aggregation liability. On the other hand, in case when the length is 30 μm or more, there might result an overdispersion state upon dispersing the particles to attain desired volume-average particle size, thus aggregation becoming easy to occur, leading to poor storage stability of the pigment dispersion.

When the length of the primary particles in the long axis direction is controlled within the above-described range, there results high fastness to light or to ozone, and the pigment dispersion acquires excellent storage stability, thus such pigment particles being preferred.

The length of the long axis of the primary particles of the α-type, β-type, and γ-type crystal form azo pigments represented by the above formula (1) observed under a transmission microscope is preferably from 0.01 μm to 30 μm, more preferably from 0.02 μm to 15 μm, most preferably from 0.03 μm to 1 μM.

In case when the length of the long axis of the primary particles observed under a transmission microscope is 0.01 μm or less, fastness to light or to ozone might be seriously reduced in some cases, or there might result poor dispersibility in some cases due to aggregation liability. On the other hand, in case when the length is 30 μM or more, there might result an overdispersion state upon dispersing the particles to attain desired volume-average particle size, thus aggregation becoming easy to occur, leading to poor storage stability of the pigment dispersion.

When the length of the primary particles in the long axis direction is controlled within the above-described range, there results high fastness to light or to ozone, and the pigment dispersion acquires excellent storage stability, thus such pigment particles being preferred.

Synthesis of the α-type, β-type, and γ-type crystal form azo pigments represented by the above formula (1) will be described in detail below.

The α-type, β-type, and γ-type crystal form azo pigments represented by formula (1) (hereinafter also referred to merely as "azo pigment" or "pigment" in some cases) can be synthesized by the production process of the invention.

The production process of the invention includes a step of conducting azo coupling reaction between a diazonium salt derived from a heterocyclic amine represented by the following formula (2) and a compound represented by the following formula (3).

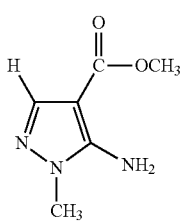

Formula (2)

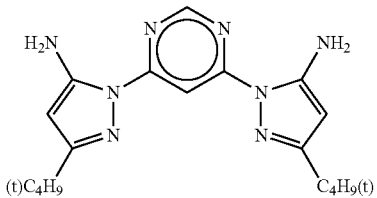

Formula (3)

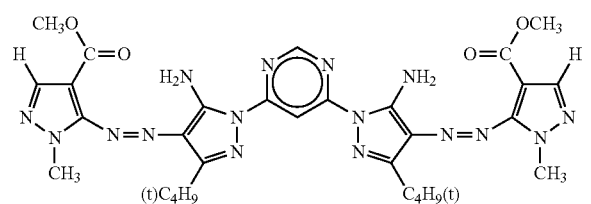

Formula (1)

Preparation of the diazonium salt and coupling reaction between the diazonium salt and the compound represented by formula (3) can be conducted in a conventional manner.

For preparation of the diazonium salt of the heterocyclic amine represented by formula (2), there may be applied, for example, a conventional process for preparing a diazonium salt using a nitrosonium ion source such as nitrous acid, nitrite or nitrosylsulfuric acid in a reaction medium containing an acid (for example, hydrochloric acid, sulfuric acid, acetic acid, propionic acid, methanesulfonic acid, or trifluoromethanesulfonic acid).

As examples of more preferred acids, there are illustrated acetic acid, propionic acid, methanesulfonic acid, phosphoric acid, and sulfuric acid, which may be used alone or in combination thereof. Of these, a combination of phosphoric acid or acetic acid and sulfuric acid, a combination of acetic acid and propionic acid, and a combination of acetic acid, propionic acid, and sulfuric acid are more preferred, with a combination of acetic acid and propionic acid and a combination of acetic acid, propionic acid, and sulfuric acid being particularly preferred.

As preferred examples of the reaction medium (solvent), organic acids and inorganic acids are preferred for use and, in particular, phosphoric acid, sulfuric acid, acetic acid, propionic acid, and methanesulfonic acid are preferred, with acetic acid and/or propionic acid being particularly preferred.

As a preferred example of the nitrosonium ion source, there are illustrated nitrous acid esters, nitrites, nitrosylsulfuric acid, etc. Of these, sodium nitrite, potassium nitrite, isoamyl nitrite, and nitrosylsulfuric acid (e.g., a $ONHSO_4$ solution in sulfuric acid) are more preferred, isoamyl nitrite and nitrosylsulfuric acid (e.g., 40 wt % to 50 wt % $ONHSO_4$ solution in sulfuric acid) are particularly preferred, and use of sodium nitrite or nitrosylsulfuric acid in the above-described preferred acid-containing reaction medium enables preparation of a diazonium salt with stability and efficiency.

The amount of the solvent to be used is preferably from 0.5- to 50-fold amount by weight, more preferably from 1- to 20-fold amount by weight, particularly preferably from 3- to 15-fold amount by weight, based on the amount of a diazo component of formula (2).

In the invention, the diazo component of formula (2) may be in a state of being dispersed in the solvent or, with some kinds of the diazo components, in a state of a solution.

The amount of the nitrosonium ion source to be used is preferably from 0.95 to 5.0 mol equivalent weight, more preferably from 1.00 to 3.00 mol equivalent weight, particularly preferably from 1.00 to 1.10 equivalent weight, in terms of the diazo component.

The reaction temperature is preferably from −15° C. to 40° C., more preferably from −5° C. to 35° C., still more preferably from 0° C. to 30° C. When the reaction temperature is lower than −15° C., the reaction rate becomes seriously small, and the time required for the synthesis becomes seriously prolonged, thus such temperature not being economically advantageous and, when the synthesis is conducted at a high temperature of higher than 40° C., the amount of produced by-products increases, thus such temperature not being preferred.

The reaction time is preferably from 30 minutes to 300 minutes, more preferably from 30 minutes to 200 minutes, still more preferably from 30 minutes to 150 minutes.

The compound represented by formula (3) can be produced by a process described in, for example, JP-A-2006-265185.

[Coupling Reaction Step]

The coupling reaction step can be conducted in an acidic reaction medium to a basic reaction medium. Preferably, however, for the azo pigment of the invention, the coupling reaction step is conducted in an acidic to neutral reaction medium. In particular, when conducted in an acidic reaction medium, the coupling reaction gives an azo pigment with good efficiency without decomposition of the diazonium salt.

As preferred examples of the reaction medium (solvent), organic acids, inorganic acids, and organic solvents may be used, with organic solvents being particularly preferred. Those solvents are preferred which, upon reaction, do not cause liquid separation phenomenon but form a uniform solution with the solvent. Examples thereof include alcoholic organic solvents such as methanol, ethanol, propanol, isopropanol, butanol, t-butyl alcohol, and amyl alcohol; ketone series organic solvents such as acetone and methyl ethyl ketone; diol series organic solvents such as ethylene glycol, diethylene glycol, triethylene glycol, propylene glycol, dipropylene glycol, and 1,3-propanediol; ether series organic solvents such as ethylene glycol monomethyl ether, ethylene glycol monoethyl ether, and ethylene glycol diethyl ether; tetrahydrofuran; dioxane; and acetonitrile. These solvents may be a mixture of two or more thereof.

Organic solvents having a polarity parameter (ET) of 40 or more are preferred. Of them, glycol series solvents having two or more hydroxyl groups in the molecule thereof, alcoholic solvents containing 3 or less carbon atoms, and ketone series solvents containing a total of 5 or less carbon atoms are more preferred, with alcoholic solvents containing 2 or less carbon atoms (for example, methanol and ethylene glycol) and ketone series solvents containing a total of 4 or less carbon atoms (for example, acetone and methyl ethyl ketone) being still more preferred. Mixed solvents thereof are also included.

The amount of the solvent to be used is preferably from 1- to 100-fold amount by weight, more preferably from 1- to 50-fold amount by weight, still more preferably from 2- to 30-fold amount by weight, based on the coupling component represented by the above formula (3).

In the invention, the coupling component of formula (3) may be in a state of being dispersed in the solvent or, with some kinds of the coupling components, in a state of a solution.

In order to produce α-type, β-type, and γ-type crystals, the amount of the coupling component to be used is preferably from 0.90 to 5.0 equivalent weight, more preferably from 0.95 to 3.00 equivalent weight, particularly preferably from 0.95 to 1.30 equivalent weight, in terms of the diazo coupling moiety.

The reaction temperature is preferably from −30° C. to 30° C., more preferably from −15° C. to 10° C., still more preferably from −10° C. to 5° C. In case when the reaction temperature is lower than −30° C., the reaction rate becomes so small that the time required for the synthesis becomes seriously prolonged, thus such temperature not being preferred in view of production cost whereas, in case when the synthesis is conducted at a temperature higher than 30° C., the amount of produced by-products is increased, thus such temperature not being preferred.

The reaction time is preferably from 30 minutes to 300 minutes, more preferably from 30 minutes to 200 minutes, still more preferably from 30 minutes to 150 minutes.

In the process of the invention for synthesizing the azo pigment, the product obtained by these reactions (crude azo pigment) may be used after being treated according to an after-treatment employed in common organic synthesis reactions and after or without being purified.

That is, a product isolated from the reaction system may be used without purification or after being subjected to purifying through a single operation of, or a combination of, recrystallization, salt formation, etc.

Also, after completion of the reaction, the reaction solvent may or may not be distilled off, the reaction product may be poured into water or ice-water, the resulting solution may or may not be neutralized, and the liberated portion or the extract obtained by extracting with an organic solvent/water solution may or may not be purified through a single operation of, or a combination of, recrystallization, crystallization, salt formation, etc. to use.

The process for synthesizing the azo pigment of the invention will be described in more detail below.

The process for producing the azo pigment of the invention is characterized by conducting a coupling reaction between a diazonium compound prepared by diazotizing a heterocyclic amine represented by the above formula (2) and a compound represented by the above formula (3) after dissolving the compound of formula (3) in an organic solvent.

The diazotization reaction of the heterocyclic amine represented by the above formula (2) may be conducted by, for example, reacting the amine with a reagent such as sodium nitrite or nitrosylsulfuric acid in an acidic solvent such as sulfuric acid, phosphoric acid, or acetic acid at a temperature of 30° C. or lower than that for a period of from about 10 minutes to about 6 hours. The coupling reaction is conducted preferably by reacting the diazonium salt obtained by the above-described process with the compound represented by the above formula (3) at 40° C. or lower than that, preferably 15° C. or lower than that, for a period of from about 10 minutes to about 12 hours.

The above-described control of tautomerization and/or polymorphism can be attained through production conditions upon coupling reaction. As a process for producing α-, β-, and γ-type crystals of the invention which is a more preferred embodiment, it is preferred to employ, for example, a process of the invention wherein the coupling reaction is conducted after once dissolving the compound represented by the above formula (3) in an organic solvent. As the organic solvent which can be used here, there are illustrated, for example, alcoholic solvents and ketone series solvents. As the alcoholic solvents, methanol, ethanol, i-propanol, ethylene glycol, and diethylene glycol are preferred. Of these, methanol is particularly preferred. As the ketone series solvents, acetone, methyl ethyl ketone, and cyclohexanone are preferred. Of these, acetone is particularly preferred.

Another process for producing the azo pigment of the invention is characterized by conducting the coupling reaction between a diazonium compound prepared by diazotizing a heterocyclic amine represented by the foregoing formula (2) and a compound represented by the foregoing formula (3) in the presence of a polar aprotic solvent.

The α-type crystals can also be produced with good efficiency by conducting the coupling reaction in the presence of a polar aprotic solvent. Examples of the polar aprotic solvent include N,N-dimethylformamide, N,N-dimethylacetamide, N-methyl-2-pyrrolidone, dimethylsulfoxide, tetramethylurea, acetone, methyl ethyl ketone, acetonitrile, and a mixed solvent thereof. Of these solvents, acetone, methyl ethyl ketone, N,N-dimethylacetamide, and acetonitrile are particularly preferred. In the case of using these solvents, the compound of the above formula (3) may or may not be completely soluble in the solvent.

The compound obtained by the above-described production process may or may not be subjected to adjustment of pH by adding a base as a purifying step according to use. In the case of adjusting pH, the pH is preferably from 4 to 10. Of them, a pH of from 5 to 8 is more preferred, with a pH of 5.5 to 7.5 being particularly preferred.

In the process of purifying β-type crystals, the pH is more preferably from 4.5 to 8, particularly preferably from 5 to 7.

When the pH is 10 or less than that, the resulting hue does not give an increased reddish tone, thus such pH being preferred in view of hue. When the pH is 4 or more, there scarcely occurs a problem of, for example, corrosion of a nozzle in the case of being used as an ink for inkjet recording, thus such pH being preferred.

The above-described production process gives the compound represented by the above formula (1) as a crude azo pigment (crude).

The invention also relates to α-type, β-type, and γ-type crystal form azo pigments produced by the above-described production process.

[After-Treating Step]

In the production process of the invention, the production process preferably includes a step of conducting after-treatment (finishing). Also, the production process more preferably includes a step of successively conducting after-treatment without isolating the azo pigment obtained by the production process of the invention. The term "finishing" as used in the invention means a treatment for making uniform the crystal form, size and shape of particles, and the like. As the method of the after-treating step, there are illustrated, for example, a pigment particle size-controlling step by milling treatment such as solvent-salt milling, salt milling, dry milling, solvent milling, or acid pasting, or by solvent heating treatment; and a surface-treating step with a resin, a surfactant, a dispersing agent, etc.

The compound of the invention represented by formula (1) is preferably subjected to the after-treatment of solvent-heating treatment and/or solvent salt milling. For example, α-type crystal form azo pigment can be produced by refluxing in a water-free organic solvent.

As a solvent to be used in the solvent heating treatment, there are illustrated, for example, water; aromatic hydrocarbon series solvents such as toluene and xylene; halogenated hydrocarbon series solvents such as chlorobenzene and o-dichlorobenzene; alcoholic solvents such as i-propanol and i-butanol; polar aprotic organic solvents such as N,N-dimethylformamide, N,N-dimethylacetamide, N-methyl-2-pyrrolidone, acetone, methyl ethyl ketone, and acetonitrile; glacial acetic acid; pyridine; and a mixture thereof. An inorganic or organic acid or base may further be added to the above-illustrated solvents.

The temperature of the solvent heating treatment varies depending upon the desired primary particle size of the pigment, but is preferably from 40 to 150° C., more preferably from 60 to 100° C. Also, the treating time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 μm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(1-pentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount based on the crude azo pigment. The kneading temperature is preferably from 20 to 130° C., particularly preferably from 40 to 110° C. As a kneader, there can be used, for example, a kneader or a mix muller.

[Pigment Dispersion]

The pigment dispersion of the invention is characterized in that it contains at least one of the azo pigments of the invention. Thus, there can be obtained a pigment dispersion having excellent coloring characteristics, durability, and dispersion stability.

The pigment dispersion of the invention may be aqueous or non-aqueous, but is preferably an aqueous pigment dispersion. As the aqueous liquid for dispersing the pigment in the aqueous pigment dispersion of the invention, a mixture containing water as a major component and, as needed, a hydrophilic organic solvent can be used. Examples of the aforesaid hydrophilic organic solvent include alcohols such as methanol, ethanol, propanol, i-propanol, butanol, i-butanol, s-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use. Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention includes the pigment represented by the foregoing formula (1) dispersed in a non-aqueous vehicle. Examples of resins to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photo-curable resin as the non-aqueous vehicle.

Also, examples of the solvents to be used in the non-aqueous vehicles include aromatic solvents such as toluene, xylene, and methoxybenzene; ester acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl i-butyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

The pigment dispersion of the invention is obtained by dispersing the above-described azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), a ultrasonic wave system, a high-pressure emulsion dispersion system (high-pressure homogenizer; specific commercially available apparatuses being Gaulin homogenizer, a microfluidizer, and DeBEE2000).

In the invention, the volume-average particle size of the pigment is preferably from 10 nm to 200 nm.

When the volume-average particle size of the particles in the pigment dispersion is 10 nm or more, stability with time of the dispersion is increased, an aggregation scarcely occurs, thus such particle size being preferred. Also, when the volume-average particle size is 200 nm or less, there result an increased optical density, density of printed products is increased, color reproducibility of a color-mixing portion where, for example, red and green colors are mixed, transparency is enhanced, and clogging of nozzles scarcely occurs upon printing by means of an inkjet system, thus such particle size being preferred.

Additionally, the term "volume-average particle size of the pigment particles" means the particle size of the pigment itself or, in a case where an additive such as a dispersing agent is adhered to the coloring material, means the size of the particle with the additive being adhered thereto. In the invention, as an apparatus for measuring the volume-average particle size of the pigment, a particle size analyzer of Nanotrac UPA (UPA-EX150; manufactured by Nikkiso Co., Ltd.) is used. The measurement is conducted according to a predetermined measuring method by placing 3 ml of a pigment dispersion in a measuring cell. Additionally, with respect to parameters to be inputted upon measurement, an ink viscosity is used as a viscosity, and a pigment density is used as a density of the dispersed particles.

The volume-average particle size is more preferably from 15 nm to 150 nm, still more preferably from 20 nm to 130 nm, most preferably from 25 nm to 100 nm.

In case when the volume-average particle size of particles in the pigment dispersion is less than 10 nm, storage stability might not be ensured in some cases whereas, in case when the volume-average particle size exceeds 200 nm, the optical density might be reduced in some cases.

In order to adjust the volume-average particle size of the α-type crystal form azo pigment to the above-described range, the following methods may, for example, be employed. 0.25 part of the azo pigment, 0.05 part of sodium oleate, 0.5 part of glycerin, and 4.2 parts of water are mixed with each other, followed by dispersing for 2 hours at a speed of 300 rotations per minute using a planetary ball mill containing 10 parts of zirconia beads of 0.1 mm in diameter, whereby the volume-average particle size falls within the range of from 0.06 to 0.08 μm (60 nm to 80 nm). Also, when the dispersing procedure is conducted for 3 hours, the volume-average particle size falls within the range of from 0.025 to 0.035 μm (25 nm to 35 nm).

In order to adjust the volume-average particle size of the β-type crystal form azo pigment to the above-described range, the following methods may, for example, be employed. 0.25 part of the azo pigment, 0.05 part of sodium oleate, 0.5 part of glycerin, and 4.2 parts of water are mixed with each other, followed by dispersing for 3 hours at a speed of 300 rotations per minute using a planetary ball mill containing 10 parts of zirconia beads of 0.1 mm in diameter, whereby the volume-average particle size falls within the range of from 0.04 to 0.06 μm (40 nm to 60 nm). Also, when the dispersing procedure is conducted for 5 hours, the volume-average particle size falls within the range of from 0.025 to 0.035 μm (25 nm to 35 nm).

In order to adjust the volume-average particle size of the γ-type crystal form azo pigment to the above-described range, the following methods may, for example, be employed. 0.25 part of the azo pigment, 0.05 part of sodium oleate, 0.5 part of glycerin, and 4.2 parts of water are mixed with each other, followed by dispersing for 3 hours at a speed of 300 rotations per minute using a planetary ball mill containing 10 parts of zirconia beads of 0.1 mm in diameter, whereby the volume-average particle size falls within the range of from 0.05 to 0.08 μm (50 nm to 80 nm). Also, when the dispersing procedure is conducted for 5 hours, the volume-average particle size falls within the range of from 0.025 to 0.035 μm (25 nm to 35 nm).

The content of the pigment contained in the pigment dispersion of the invention is preferably in the range of from 1 to 35% by weight, more preferably in the range of from 2 to 25% by weight. In case when the content is less than 1% by weight, a sufficient image density might not be obtained in some cases by using the pigment dispersion independently as an ink. In case when the content exceeds 35% by weight, dispersion stability might be reduced in some cases.

As uses of the azo pigments of the invention, there are illustrated image recording materials for forming images, particularly color images. Specifically, there are illustrated inkjet system recording materials to be described in detail below, heat-sensitive recording materials, pressure-sensitive recording materials, recording materials for the electro-photographic system, transfer system silver halide light-sensitive materials, printing inks, and recording pens, preferably inkjet system recording materials, heat-sensitive recording materials, and recording materials for the electro-photographic system, more preferably inkjet system recording materials.

In addition, the pigment can find application to color filters for recording and reproducing color images to be used in solid state imaging devices such as CCDs and in displays such as LCD and PDP and to a pigmenting solution for pigmenting various fibers.

The azo pigment of the invention can be used by adjusting its physical properties such as solvent resistance, dispersibility, and thermal migration properties so as to be suited for its use.

The azo pigment of the invention may be used in an emulsion dispersion state or in a solid dispersion state according to the system wherein it is used.

[Coloring Composition]

The coloring composition of the invention means a coloring composition containing at least one azo pigment of the invention. The coloring composition of the invention can contain a medium and, in the case where a solvent is used as the medium, the composition is particularly appropriate as an ink for inkjet recording. The coloring composition of the invention can be prepared by using an oleophilic medium or an aqueous medium as the medium and dispersing the azo pigment of the invention in the medium. Preferred is the case of using the aqueous medium. The coloring composition of the invention includes a composition for an ink excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antifading agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of water-soluble inks, these various additives are added directly to the ink solution. In the case of oil-soluble inks, it is general to add the additives to a dispersion after preparing the azo pigment dispersion, but they may be added to an oil phase or an aqueous phase upon preparation.

[Ink]

Next, the ink will be described below.

In the invention, the above-described pigment dispersion can be used in the ink, and the ink is preferably prepared by mixing with a water-soluble solvent, water, or the like. However, in the case where no particular problems are involved, the aforesaid pigment dispersion of the invention may be used as such.

The ink of the invention for inkjet recording contains the pigment dispersion of the invention, and the ink of the invention can also be used as an ink for inkjet recording.

Also, the coloring composition containing the pigment of the invention can preferably be used as an ink for inkjet recording.

[Ink for Inkjet Recording]

Next, the ink for inkjet recording will be described below.

The ink for inkjet recording (hereinafter also referred to as "ink") uses the pigment dispersion described above, and is preferably prepared by mixing with a water-soluble solvent, water, or the like. However, in the case where no particular problems are involved, the aforesaid pigment dispersion of the invention described above may be used as such.

In consideration of hue, color density, saturation, and transparency of an image formed on a recording medium, the content of the pigment dispersion in the ink is in the range of preferably from 1 to 100% by weight, particularly preferably from 3 to 20% by weight, most preferably from 3 to 10% by weight.

The pigment of the invention is contained in an amount of preferably from 0.1 part by weight to 20 parts by weight, more preferably from 0.2 part by weight to 10 parts by weight, still more preferably from 1 to 10 parts by weight, in 100 parts by weight of the ink. The ink of the invention may further contain other pigment in combination with the pigment of the invention. In the case of using two or more kinds of pigments, the total amount of the pigments is preferably within the above-described range.

The ink can be used for forming a full-color image as well as a mono-color image. In order to form the full-color image, a magenta tone ink, a cyan tone ink, and a yellow tone ink can be used and, further, a black tone ink can be used for adjusting tone.

Further, in the ink of the invention may be used other pigments in addition to the azo pigment of the invention. As yellow pigments to be applied, there are illustrated, for example, C.I.P.Y.-74, C.I.P.Y.-128, C.I.P.Y.-155, and C.I.P.Y.-213. As magenta pigments to be applied, there are illustrated C.I.P.V.-19 and C.I.P.R.-122. As cyan pigments to be applied, there are illustrated C.I.P.B.-15:3 and C.I.P.B.-15:4. Apart from these pigments, any pigment may be used as each pigment. As a black color material, there can be illustrated a dispersion of carbon black as well as disazo, trisazo, and tetrazo pigments.

As the water-soluble solvents to be used in the ink, polyhydric alcohols, polyhydric alcohol derivatives, nitrogen-containing solvents, alcohols, and sulfur-containing solvents are used.

Specific examples of the polyhydric alcohols include ethylene glycol, diethylene glycol, propylene glycol, butylene glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, i-propanol, n-butanol, and benzyl alcohol, and examples of the sulfur-containing solvents include thiodiethanol, thiodiglycerol, sulfolane, and dimethylsulfoxide. Besides, propylene carbonate, ethylene carbonate, etc. may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer. Additionally, the above-described surface tension is measured under the environment of 23° C. and 55% RH by using a Wilhelmy surface tension balance as is the same as described above.

The viscosity of the ink is preferably from 1.2 mPa·s to 8.0 mPa·s, more preferably from 1.5 mPa·s to less than 6.0 mPa·s, still more preferably from 1.8 mPa·s to less than 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases.

Additionally, the above-described viscosity (including that to be described hereinafter) is measured by using a rotational viscometer Rheomat 115 (manufactured by Contraves Co.) at 23° C. and a shear rate of $1,400 \text{ s}^{-1}$.

In addition to the above-mentioned individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the ink.

Further, for the purpose of controlling characteristic properties such as improvement of ejection properties, there can be used, as needed, polyethyleneimine, polyamines, polyvinylpyrrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, fluorine-containing surfactants, and the like.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate.

Besides, pH buffers, antioxidants, antifungal agents, viscosity-adjusting agents, electrically conductive agents, ultraviolet ray absorbents, etc. may also be added as needed.

[Inkjet Recording Method, Inkjet Recording Apparatus, and Ink Tank for Inkjet Recording]

Inkjet recording method is a method of forming an image on the surface of a recording medium by using an ink for inkjet recording, and ejecting the ink onto the surface of the recording medium from a recording head according to record signals.

Also, an inkjet recording apparatus is an apparatus wherein an ink for inkjet recording is used and a recording head capable of ejecting the ink (if necessary, a processing solution) onto the surface of a recording medium is provided, with the ink being ejected onto the surface of the recording medium from the recording head to form an image. Additionally, the inkjet recording apparatus can feed the ink to the recording head, and may be equipped with an ink tank for inkjet recording (hereinafter also referred to as "ink tank") which is removable from the main body of the inkjet recording apparatus. In this case, the ink is contained in the ink tank for inkjet recording.

As the inkjet recording apparatus, an ordinary inkjet recording apparatus equipped with a printing system capable of using an ink for inkjet recording can be utilized. In addition, there may be employed an inkjet recording apparatus having mounted thereon a heater or the like for controlling drying of the ink, or an inkjet recording apparatus equipped with a transfer mechanism which ejects (print) an ink and a processing solution onto an intermediate body, and then transfers the image on the intermediate body onto a recording medium such as paper.

Also, as the ink tank for inkjet recording, any conventionally known ink tank can be utilized as long as it is removable from the inkjet recording apparatus equipped with a recording head and has a constitution that it can feed, in a state of being mounted on the inkjet recording apparatus, an ink to a recording head.

In view of the effect of reducing blurring and inter-color bleeding, it is preferred to employ a thermal inkjet recording system or a piezo inkjet recording system as an inkjet recording method (apparatus). With the thermal inkjet recording system, an ink is heated upon ejection to have a low viscosity, and the temperature of the ink decreases when the ink reaches onto a recording medium, leading to a sharp increase in viscosity. This serves to provide the effect of reducing blurring and inter-color bleeding. On the other hand, with the piezo inkjet recording system, a liquid with high viscosity can be ejected and, since the liquid with high viscosity can suppress its spread in the direction of paper surface on a recording medium, it serves to provide the effect of reducing blurring and inter-color bleeding.

In the inkjet recording method (apparatus), replenishment (feeding) of the ink to the head is conducted preferably from an ink tank filled with an ink liquid (including, as needed, a processing solution tank). This ink tank is preferably a cartridge system tank which is removable from the main body of the apparatus. Replenishment of the ink can be conducted with ease by exchanging the cartridge system ink tank.

[Color Toner]

The content of the azo pigment in 100 parts by weight of a color toner is not particularly limited, but is preferably 0.1 part by weight or more, more preferably from 1 to 20 parts by weight, most preferably from 2 to 10 parts by weight. As a binder resin for a color toner into which the azo pigment is to be introduced, any of all binders that are commonly used may be used. Examples thereof include styrene series resins, acryl series resins, styrene/acryl series resins, and polyester resins.

For the purpose of improving flowability or for controlling electrostatic charge, inorganic fine powders or organic fine particles may be externally added to the toner. Silica fine particles and titania fine particles surface-treated with a coupling agent containing an alkyl group are preferably used. Additionally, these have a number-average primary particle size of preferably from 10 to 500 nm, and are added to the toner in a content of preferably from 0.1 to 20% by weight.

As the release agent, any of conventionally used release agents can be used. Specific examples thereof include olefins such as low molecular polypropylene, low molecular polyethylene, and ethylene-propylene copolymer, and waxes such as microcrystalline wax, carnauba wax, sazol wax, and paraffin wax. The addition amount thereof is preferably from 1 to 5% by weight in the toner.

The charge controlling agent may be added as needed and, in view of color forming properties, colorless agents are preferred. Examples thereof include those of quaternary ammonium salt structure and those of calixarene structure.

As the carrier, any of non-coated carriers constituted by particles of magnetic material such as iron or ferrite alone, and resin-coated carriers including magnetic material particles whose surface is coated with a resin may be used. The average particle size of the carrier is preferably from 30 to 150 μm in terms of volume-average particle size.

The image-forming method to which the toner of the invention is applied is not particularly limited, and examples thereof include an image-forming method by repeatedly forming a color image and transferring it, and a method of forming a color image by successively transferring an image formed on an electro-photographic photoreceptor onto an intermediate transfer body to form a color image on the intermediate transfer body and transferring the color image onto an image-forming member such as paper.

[Thermally Recording (Transferring) Material]

The thermally recording material is constituted by an ink sheet including support having coated thereon the pigment of the invention together with a binder, and an image-receiving sheet for immobilizing the pigment traveled in conformity with a thermal energy added from a thermal head according to image-recording signals. The ink sheet can be formed by dispersing the azo pigment of the invention in a solvent together with a binder as fine particles in a solvent to prepare an ink liquid, coating the ink on a support, and properly drying the coated ink. The amount of the ink to be coated on the support is not particularly limited, but is preferably from 30 to 1000 mg/m$^2$. As preferred binder resin, ink solvent, support and, further, an image-receiving sheet, those which are described in JP-A-7-137466 can preferably be used.

In applying the thermally recording material to a thermally recording material capable of recording a full color image, it is preferred to form it by successively coating on a support a cyan ink sheet containing a thermally diffusible cyan colorant which can form a cyan image, a magenta ink sheet containing a thermally diffusible magenta colorant which can form a magenta image, and a yellow ink sheet containing a thermally diffusible yellow colorant which can form a yellow image. Also, an ink sheet containing a black image-forming substance may further be formed as needed.

[Color Filter]

As a method for forming a color filter, there are a method of first forming a pattern by a photo resist and then pigmenting, and a method of forming a pattern by a photo resist containing a colorant as described in JP-A-4-163552, JP-A-4-128703, and JP-A-4-175753. As a method to be employed in the case of introducing the colorant of the invention into a color filter, any of these methods may be employed. As a preferred method, there can be illustrated a method of forming a color filter which includes exposing through a mask a positive-working composition having a thermosetting composition, a quinonediazide compound, a cross-linking agent, a colorant, and a solvent and being coated on a substrate, developing the exposed portion to form a positive resist pattern, exposing the whole positive resist pattern, then curing the exposed resist pattern, as described in JP-A-4-175753 and JP-A-6-35182. Also, an RGB primary color-based color filter or a YMC complementary color-based color filter can be obtained by forming a black matrix according to a conventional manner. With the color filter, too, there are no limits as to the amount of the pigment to be used, but a content of from 0.1 to 50% by weight is preferred.

As to the thermosetting resin, the quinonediazide compound, the cross-linking agent, and the solvent to be used in forming the color filter, and the amounts thereof to be used, those which are described in the aforesaid patent documents can preferably be used.

The present invention is described in more detail with reference to the following examples, but the invention should not be construed as being limited thereto. Additionally, "parts" as used in Examples are by weight.

EXAMPLES

Measurement of the X-ray diffraction of the α-type, β-type, and γ-type crystal form azo pigments of the invention is conducted according to Japanese Industrial Standards JISK0131 (General Rule of X-ray diffractiometry) under the following conditions using a powder X-ray diffractometer, RINT 2500 (manufactured by Rigaku Industrial Corp.) and Cu Kα line.

Measuring apparatus used: automatic X-ray diffractometer, RINT 2500 (manufactured by Rigaku Industrial Corp.)
X-ray tube: Cu
Tube voltage: 55 KV
Tube current: 280 mA
Scanning method: 2θ/θ scan
Scanning speed: 6 deg/min
Sampling interval: 0.100 deg.
Starting angle (2θ): 5 deg.
Stopping angle (2θ): 55 deg.
Divergence slit: 2 deg.
Scattering slit: 2 deg.
Receiving slit: 0.6 mm
A vertical goniometer is used.

Synthesis Example 1-1

Synthesis of α-Type Crystal Form Azo Pigment (1)-1

Synthesis scheme of α-type crystal form azo pigment (1)-1 to (1)-9 is shown below.

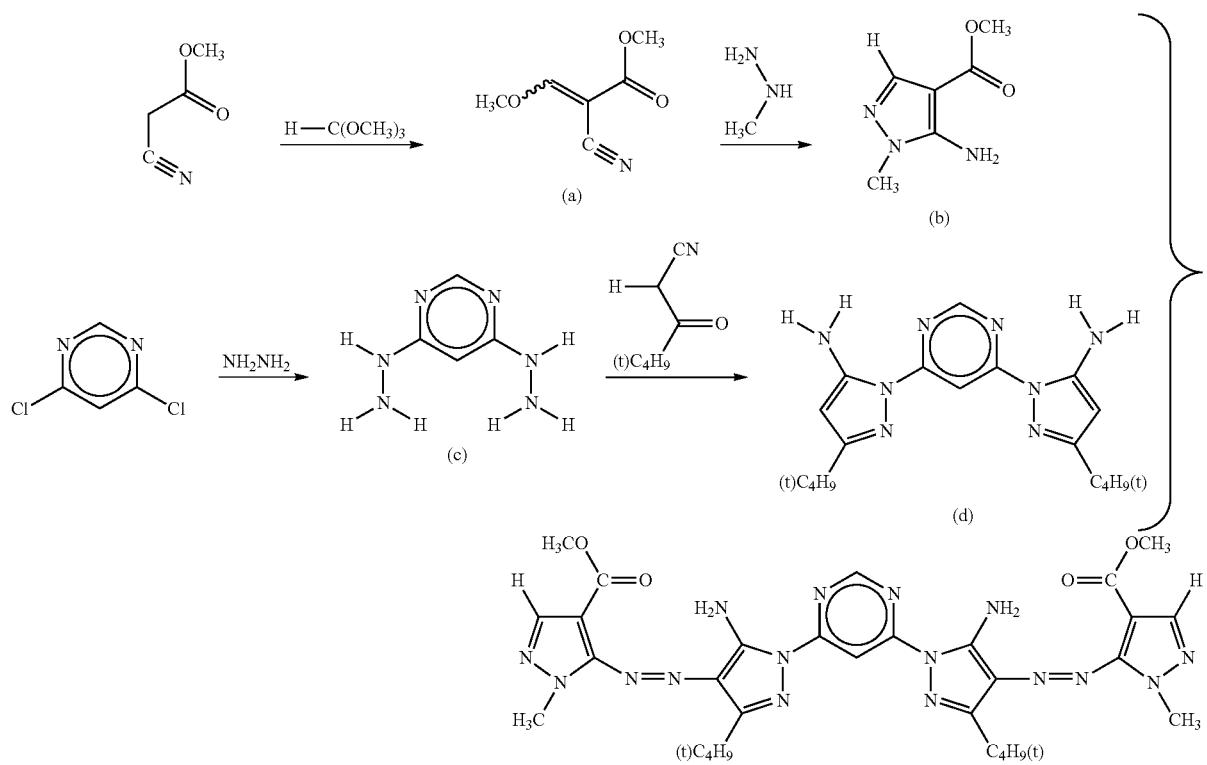

(1) Synthesis of Intermediate (a)

42.4 g (0.4 mol) of trimethyl orthoformate, 20.4 g (0.2 mol) of acetic acid anhydride, and 0.5 g of p-toluenesulfonic acid are added to 29.7 g (0.3 mol) of methyl cyanoacetate, and the resulting mixture is heated to 110° C. (external temperature), followed by stirring for 20 hours with distilling off low-boiling components produced from the reaction system. The resulting reaction solution is concentrated under reduced pressure, and is subjected to silica gel column purification to obtain 14.1 g (yellow powder; yield: 30%) of the intermediate (a). Results of NMR measurement of the thus-obtained intermediate (a) are as follows. $^1$H-NMR (300 MHz, CDCl$_3$): 7.96 (s, 1H), 4.15 (s, 3H), 3.81 (s, 3H)

(2) Synthesis of Intermediate (b)

150 mL of i-propanol is added to 7.4 mL (141 mmol) of methylhydrazine, followed by cooling to 15° C. (internal temperature). After gradually adding 7.0 g (49.6 mmol) of the intermediate (a) to this mixture solution, the resulting mixture is heated to 50° C. and stirred for 1 hour and 40 minutes. This reaction solution is concentrated under reduced pressure, and is then subjected to silica gel column purification to obtain 10.5 g (white powder; yield: 50%) of the intermediate (b). Results of NMR measurement of the thus-obtained intermediate (b) are as follows. $^1$H-NMR (300 MHz, CDCl$_3$): 7.60 (s, 1H), 4.95 (brs, 2H), 3.80 (s, 3H), 3.60 (s, 3H)

(3) Synthesis of Intermediate (c)

298 mL of methanol is added to 387 mL (7.98 mol) of hydrazine monohydrate, followed by cooling to 10° C. (internal temperature). To the resulting mixture is gradually added 149 g (1.00 mol) of 4,6-dichloropyrimidine (at an internal temperature of 20° C. or lower). Then, the ice-bath is removed, and the temperature is allowed to increase to room temperature, followed by stirring at the same temperature for 30 minutes. Thereafter, the mixture is further heated to an internal temperature of 60° C., followed by stirring for 5 hours at the same temperature. After completion of the reaction, 750 mL of water is added thereto, and the mixture is cooled with ice to an internal temperature of 8° C. Crystals precipitated are collected by filtration, spray washed with water, then with i-propanol and are dried at room temperature for 36 hours to obtain 119 g (white powder; yield: 84.5%) of the intermediate (c). Results of NMR measurement of the thus-obtained intermediate (c) are as follows.

$^1$H-NMR (300 MHz, d-DMSO): 7.80 (s, 1H), 7.52 (s, 2H), 5.98 (s, 1H), 4.13 (s, 4H)

(4) Synthesis of Intermediate (d)

128 mL of water is added to 50 g (357 mmol) of the intermediate (c), and the mixture is stirred at room temperature. To this suspension is added 98.2 g (785 mmol) of pivaloylacetonitrile, and 12 M hydrochloric acid aqueous solution is dropwise added at the same temperature to adjust the pH to 3. Then, the mixture is heated to an internal temperature of 50° C., followed by stirring for 6 hours at the same temperature. After completion of the reaction, a 8N potassium hydroxide aqueous solution is added thereto to neutralize to pH 6.4. The mixture is cooled with ice to an internal temperature of 10° C., and crystals precipitated are collected by filtration, spray washed with water. The thus-obtained crystals are dried at 60° C. under reduced pressure, and 30 mL of toluene is added to the thus-obtained crude product, and the mixture is heated to 60° C. to dissolve. The thus-obtained solution is allowed to stand at room temperature for 12 hours, and crystals precipitated are collected by filtration, spray washed with cooled toluene, and dried at 60° C. under reduced pressure to obtain 87.7 g of the intermediate (d) (white powder; yield: 69.3%). Results of NMR measurement of the thus-obtained intermediate (d) are as follows.

$^1$H-NMR (300 MHz, d-DMSO): 8.74 (s, 1H), 7.99 (s, 1H), 6.87 (s, 4H), 5.35 (s, 2H), 1.24 (s, 18H)

(5) Synthesis of α-Type Crystal Form Azo Pigment (1)-1

9.2 g of the intermediate (b) is dissolved in a mixed solution of 55 mL of acetic acid and 37 mL of propionic acid at room temperature. The resulting solution is cooled with ice to an internal temperature of −3° C., and a 40% by weight solution of nitrosylsulfuric acid in sulfuric acid is dropwise added thereto over 10 minutes at an internal temperature of −3° C. to 4° C. After stirring the mixture at an internal temperature of 4° C. for 1 hour, 0.2 g of urea is added thereto. Thereafter, the mixture is cooled to an internal temperature of −3° C., followed by stirring for further 10 minutes to obtain a diazonium salt solution. Separately, 10 g of the intermediate (d) is completely dissolved in 150 mL of acetone, and the solution is cooled to an internal temperature of 17° C. and added to the above-described diazonium salt solution over 25 minutes at an internal temperature ranging from −3° C. to 3° C. After completion of the addition, the mixture is stirred at 3° C. for 30 minutes, and the ice bath is removed to allow the temperature of the mixture to rise to room temperature. After stirring the mixture at room temperature for 30 minutes, crystals obtained are collected by filtration to obtain a crude pigment (1-1).

The thus-obtained crude pigment (1-1) is suspended in 400 mL of water without drying, and a 8N potassium hydroxide aqueous solution is added thereto to adjust the pH to 5.7. After stirring the suspension at room temperature for 20 minutes, crystals obtained are collected by filtration, sufficiently spray washed with water, then with 80 mL of acetone. The thus-obtained crystals are dried at room temperature for 12 hours to obtain a crude pigment (1-2).

The thus-obtained crude pigment (1-2) is suspended in 580 mL of acetone, and the suspension is stirred for 30 minutes under reflux. Thereafter, the suspension is cooled to room temperature over 10 minutes, and crystals obtained are collected by filtration, followed by drying at room temperature for 5 hours to obtain 17.1 g of the α-type crystal form azo pigment (1)-1 having the crystal form of the invention and represented by formula (1). Yield: 88.5%

Visual observation of the thus-obtained α-type crystal form azo pigment (1)-1 with a transmission microscope (manufactured by JEOL Ltd.; JEM-1010; electron microscope) reveals that the length of the long axis of primary particles is about 15 μm.

When X-ray diffraction of the α-type crystal form azo pigment (1)-1 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 1.

Synthesis Example 1-2

Synthesis of α-Type Crystal Form Azo Pigment (1)-2

The crude pigment (1-1) obtained in Synthesis Example 1-1 is suspended in a mixture of 600 mL of acetone and 24 mL of water, and 28% sodium methoxide is added thereto to adjust the pH to 6.9. After stirring the suspension at room temperature for 20 minutes, the mixture is stirred for 2 hours under reflux. Thereafter, crystals obtained are collected by hot filtration, sufficiently spray washed with water, then with 200 mL of acetone. The thus-obtained crystals are dried at room temperature for 5 hours to obtain 18.2 g of the α-type crystal form azo pigment (1)-2 having the crystal form of the invention and represented by formula (1). Yield: 94.2%

Visual observation of the thus-obtained α-type crystal form azo pigment (1)-2 with a transmission microscope (manufactured by JEOL Ltd.; JEM-1010; electron microscope) reveals that the length of the long axis of primary particles is about 20 μm.

Figure 2:
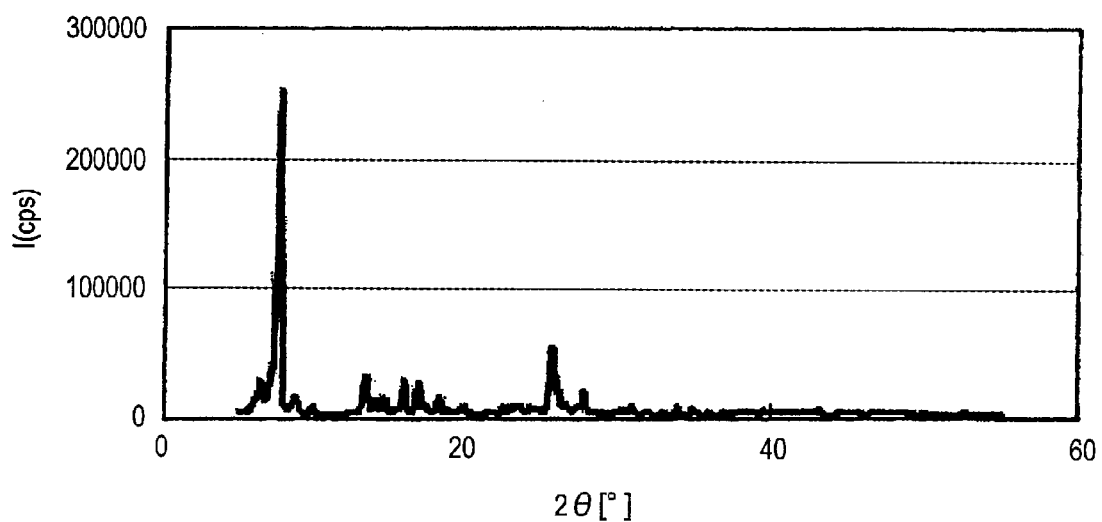
FIG. 2 is an X-ray diffraction pattern of an α-type crystal form azo pigment (1)-2 synthesized according to Synthesis Example 1-2.

When X-ray diffraction of the α-type crystal form azo pigment (1)-2 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 2.

Synthesis Example 1-3

Synthesis of α-Type Crystal Form Azo Pigment (1)-3

The crude pigment (1-2) obtained in Synthesis Example 1-1 is suspended in a mixture of 200 mL of methanol and 200 mL of water, followed by stirring for 5 hours under reflux. Thereafter, crystals obtained are collected by hot filtration, and dried at room temperature for 12 hours under reduced pressure to obtain 18.8 g of the α-type crystal form azo pigment (1)-3 having the crystal form of the invention and represented by formula (1). Yield: 95.2%

Visual observation of the thus-obtained α-type crystal form azo pigment (1)-2 with a transmission microscope (manufactured by JEOL Ltd.; JEM-1010; electron microscope) reveals that the length of the long axis of primary particles is about 1 μm.

Figure 3:
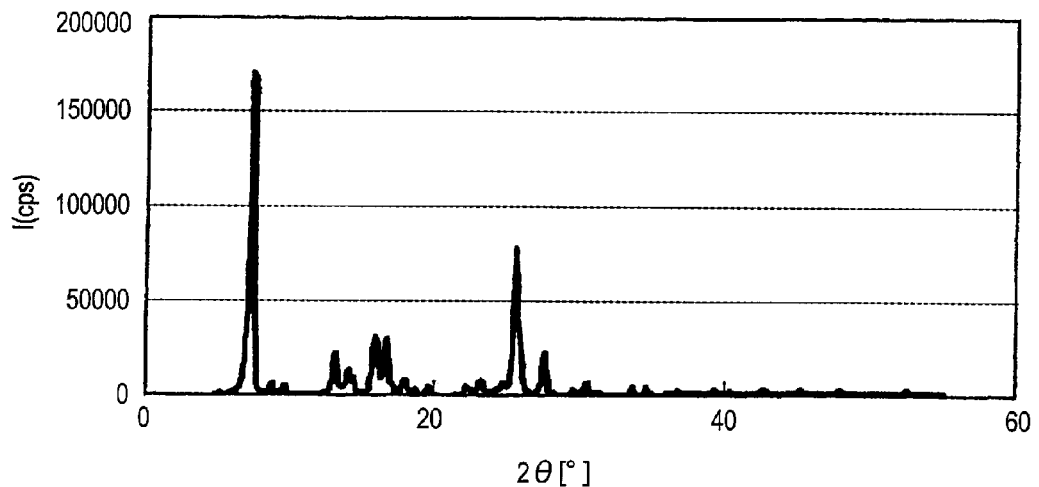
FIG. 3 is an X-ray diffraction pattern of an α-type crystal form azo pigment (1)-3 synthesized according to Synthesis Example 1-3.

When X-ray diffraction of the α-type crystal form azo pigment (1)-3 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 3.

Synthesis Example 1-4

Synthesis of α-Type Crystal Form Azo Pigment (1)-4

The crude pigment (1-2) obtained in Synthesis Example 1-1 is suspended in a mixture of 380 mL of water and 19 mL of triethylamine, followed by stirring for 2 hours at an internal temperature of 75° C. Thereafter, crystals obtained are collected by hot filtration, spray washed with 100 mL of water, and then dried for 12 hours at room temperature under reduced pressure to obtain 19.0 g of the α-type crystal form azo pigment (1)-4 having the crystal form of the invention and represented by formula (1). Yield: 96.0%

Visual observation of the thus-obtained α-type crystal form azo pigment (1)-4 with a transmission microscope (manufactured by JEOL Ltd.; JEM-1010; electron microscope) reveals that the length of the long axis of primary particles is about 0.6 μm.

Figure 4:
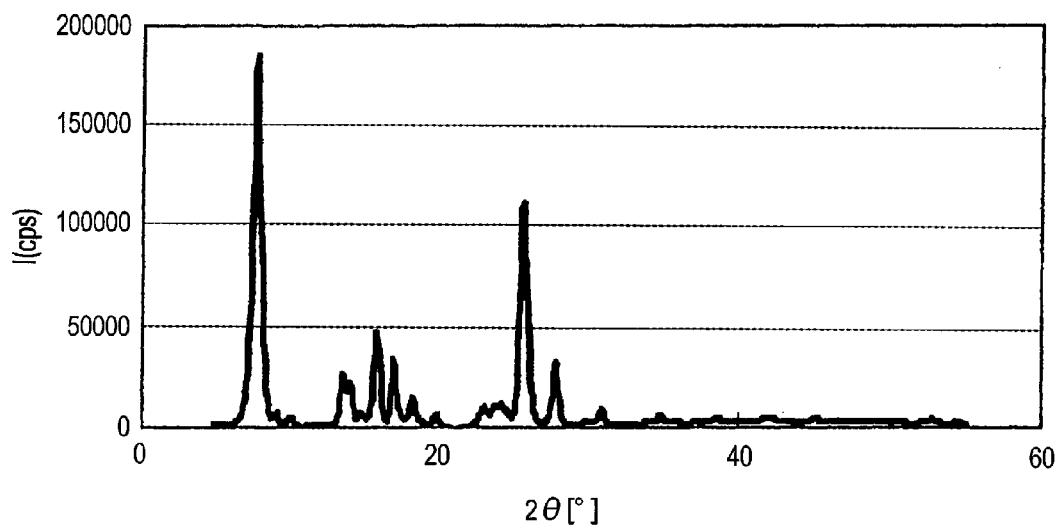
FIG. 4 is an X-ray diffraction pattern of an α-type crystal form azo pigment (1)-4 synthesized according to Synthesis Example 1-4.

When X-ray diffraction of the α-type crystal form azo pigment (1)-4 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 4.

Synthesis Example 1-5

Synthesis of α-Type Crystal Form Azo Pigment (1)-5

The crude pigment (1-2) obtained in Synthesis Example 1-1 is suspended in a mixture of 180 mL of ethylene glycol and 270 mL of water, followed by stirring for 2 hours at an internal temperature of 80° C. Thereafter, crystals obtained are collected by hot filtration, spray washed with 100 mL of water, and then dried for 12 hours at room temperature under reduced pressure to obtain 18.4 g of the α-type crystal form azo pigment (1)-5 having the crystal form of the invention and represented by formula (1). Yield: 92.8%

Visual observation of the thus-obtained α-type crystal form azo pigment (1)-5 with a transmission microscope (manufactured by JEOL Ltd.; JEM-1010; electron microscope) reveals that the length of the long axis of primary particles is about 0.8 μm.

Figure 5:
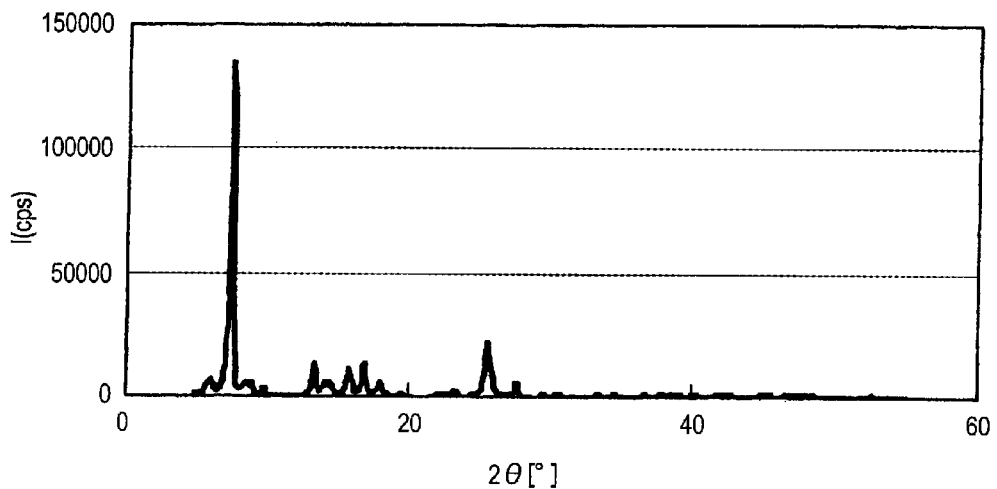
FIG. 5 is an X-ray diffraction pattern of an α-type crystal form azo pigment (1)-5 synthesized according to Synthesis Example 1-5.

When X-ray diffraction of the α-type crystal form azo pigment (1)-5 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 5.

Synthesis Example 1-6

Synthesis of α-Type Crystal Form Azo Pigment (1)-6

The crude pigment (1-2) obtained in Synthesis Example 1-1 is suspended in a mixture of 180 mL of acetonitrile and 270 mL of water, followed by stirring for 2 hours at an internal temperature of 75° C. Thereafter, crystals obtained are collected by hot filtration, spray washed with 100 mL of water, and then dried for 12 hours at room temperature under reduced pressure to obtain 18.7 g of the α-type crystal form azo pigment (1)-6 having the crystal form of the invention and represented by formula (1). Yield: 94.5%

Visual observation of the thus-obtained α-type crystal form azo pigment (1)-6 with a transmission microscope (manufactured by JEOL Ltd.; JEM-1010; electron microscope) reveals that the length of the long axis of primary particles is about 0.8 μm.

Figure 6:
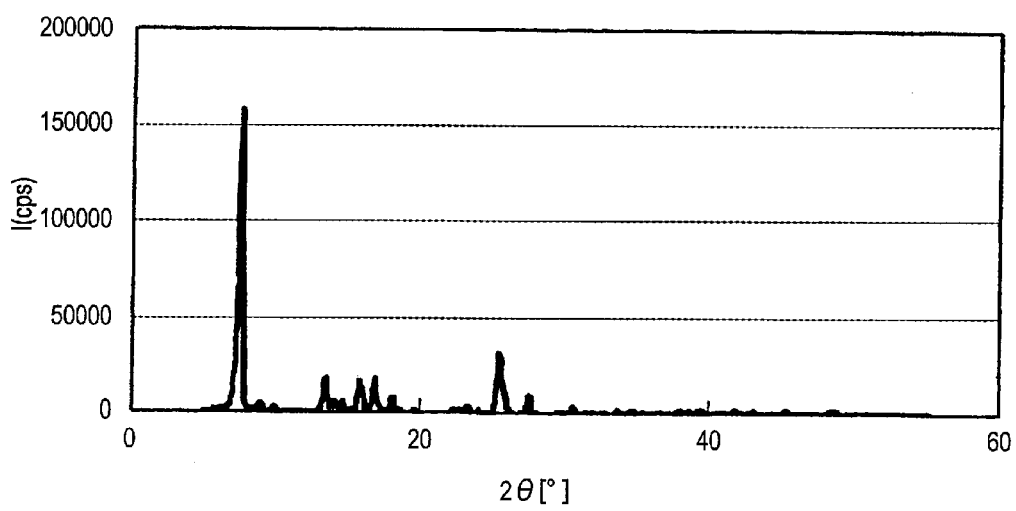
FIG. 6 is an X-ray diffraction pattern of an α-type crystal form azo pigment (1)-6 synthesized according to Synthesis Example 1-6.

When X-ray diffraction of the α-type crystal form azo pigment (1)-6 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 6.

Synthesis Example 1-7

Synthesis of α-Type Crystal Form Azo Pigment (1)-7

The crude pigment (1-2) obtained in Synthesis Example 1-1 is suspended in a mixture of 180 mL of 2-butanone and 270 mL of water, followed by stirring for 2 hours at an internal temperature of 75° C. Thereafter, crystals obtained are collected by hot filtration, spray washed with 100 mL of water, and then dried for 12 hours at room temperature under reduced pressure to obtain 18.6 g of the α-type crystal form azo pigment (1)-7 having the crystal form of the invention and represented by formula (1). Yield: 93.8%

Visual observation of the thus-obtained α-type crystal form azo pigment (1)-7 with a transmission microscope (manufactured by JEOL Ltd.; JEM-1010; electron microscope) reveals that the length of the long axis of primary particles is about 5 μm.

Figure 7:
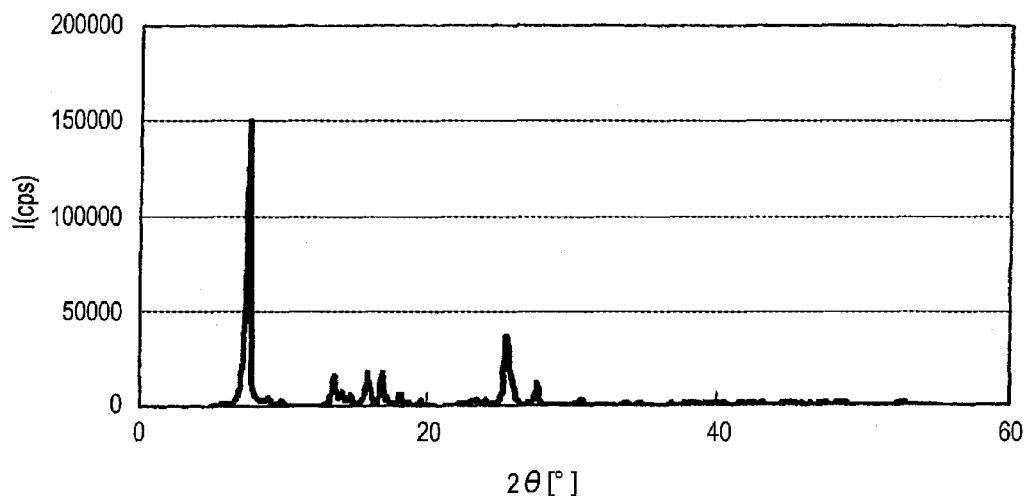
FIG. 7 is an X-ray diffraction pattern of an α-type crystal form azo pigment (1)-7 synthesized according to Synthesis Example 1-7.

When X-ray diffraction of the α-type crystal form azo pigment (1)-7 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 7.

Synthesis Example 1-8

Synthesis of α-Type Crystal Form Azo Pigment (1)-8

The crude pigment (1-2) obtained in Synthesis Example 1-1 is suspended in a mixture of 180 mL of dimethylsulfoxide and 270 mL of water, followed by stirring for 2 hours at an internal temperature of 80° C. Thereafter, crystals obtained are collected by hot filtration, spray washed with 100 mL of water, and then dried for 12 hours at room temperature under reduced pressure to obtain 19.1 g of the α-type crystal form azo pigment (1)-8 having the crystal form of the invention and represented by formula (1). Yield: 96.3%

Visual observation of the thus-obtained α-type crystal form azo pigment (1)-8 with a transmission microscope (manufactured by JEOL Ltd.; JEM-1010; electron microscope) reveals that the length of the long axis of primary particles is about 0.6

Figure 8:
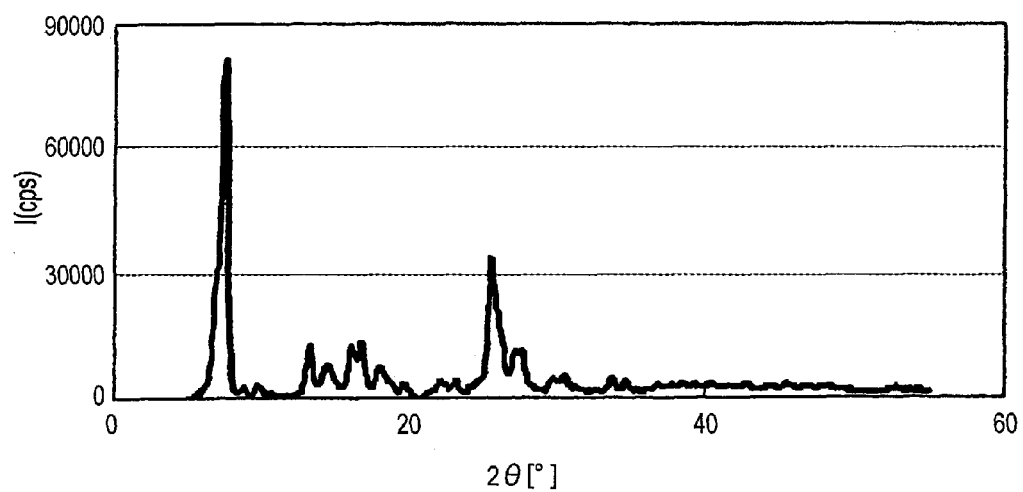
FIG. 8 is an X-ray diffraction pattern of an α-type crystal form azo pigment (1)-8 synthesized according to Synthesis Example 1-8.

When X-ray diffraction of the α-type crystal form azo pigment (1)-8 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 8.

Synthesis Example 1-9

Synthesis of α-Type Crystal Form Azo Pigment (1)-9

The crude pigment (1-2) obtained in Synthesis Example 1-1 is suspended in a mixture of 180 mL of 2-(1-methoxy) propyl acetate and 270 mL of water, followed by stirring for 2 hours at an internal temperature of 80° C. Thereafter, crystals obtained are collected by hot filtration, spray washed with 100 mL of water, and then dried for 12 hours at room temperature under reduced pressure to obtain 18.9 g of the α-type crystal form azo pigment (1)-9 having the crystal form of the invention and represented by formula (1). Yield: 95.3%

Visual observation of the thus-obtained α-type crystal form azo pigment (1)-9 with a transmission microscope (manufactured by JEOL Ltd.; JEM-1010; electron microscope) reveals that the length of the long axis of primary particles is about 1 μm.

Figure 9:
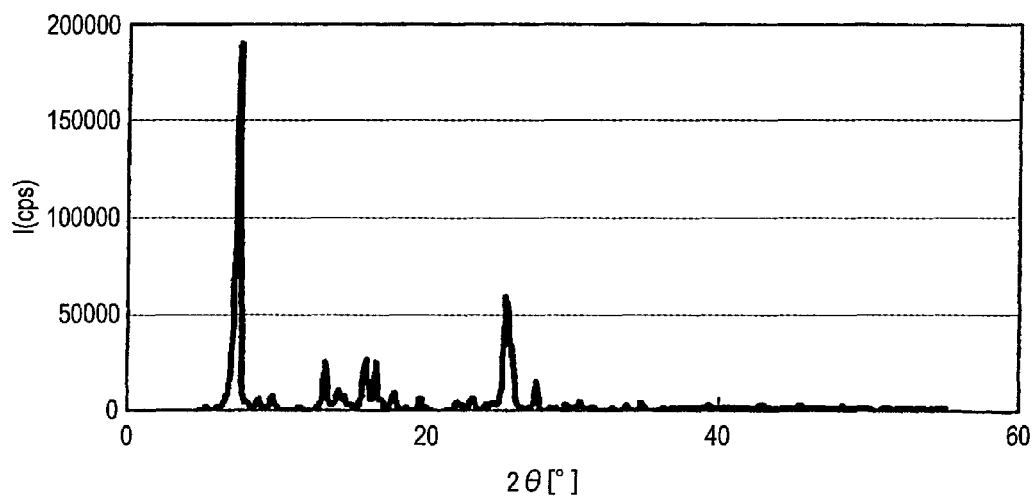
FIG. 9 is an X-ray diffraction pattern of an α-type crystal form azo pigment (1)-9 synthesized according to Synthesis Example 1-9.

When X-ray diffraction of the α-type crystal form azo pigment (1)-9 is measured under the aforesaid conditions, characteristic X-ray peaks are shown at Bragg angles) (2θ±0.2°) of 7.6° and 25.6°. The X-ray diffraction pattern with characteristic Cu Kα line is shown in FIG. 9.

Synthesis Example 2

Synthesis of β-Type Crystal Form Azo Pigment (1)-1

9.2 g of the intermediate (b) obtained in the above-described Synthesis Example 1-1 is dissolved in a mixed solution of 55 mL of acetic acid and 37 mL of propionic acid at room temperature. The resulting solution is cooled with ice to an internal temperature of −3° C., and a 40% by weight solution of nitrosylsulfuric acid in sulfuric acid is dropwise added thereto over 10 minutes at an internal temperature of −3° C. to 4° C. After stirring the mixture at an internal temperature of 4° C. for 1 hour, 0.2 g of urea is added thereto. Thereafter, the mixture is cooled to an internal temperature of −3° C., followed by stirring for further 10 minutes to obtain a diazonium salt solution. Separately, 10 g of the intermediate (d) obtained in the above-described Synthesis Example 1-1 is completely dissolved in 150 mL of acetone, and the solution is cooled to an internal temperature of 17° C. and added to the above-described diazonium salt solution over 25 minutes at an internal temperature ranging from −3° C. to 3° C. After completion of the addition, the mixture is stirred at 3° C. for 30 minutes, and the ice bath is removed to allow the temperature of the mixture to rise to room temperature over 30 minutes. After stirring the mixture at room temperature for 30 minutes, crystals obtained are collected by filtration, spray washed with 150 mL of acetone, then with 100 mL of water. Crystals obtained are suspended in 400 mL of water without drying, and a 8N potassium hydroxide aqueous solution is added thereto to adjust the pH to 5.7. After stirring the mixture at room temperature for 25 minutes, crystals obtained are collected by filtration, sufficiently spray washed with water. The thus-obtained crude pigment (1)-1 is dried at room temperature for 12 hours.

The thus-obtained crude pigment (1)-1 is suspended in a mixed solvent of 580 mL of acetone and 1160 mL of water, followed by stirring for 30 minutes under reflux. Thereafter, the mixture is cooled to room temperature over 10 minutes, followed by stirring at room temperature for 5 hours to obtain 17.6 g of β-type crystal form azo pigment (1)-1 having the crystal form of the invention and represented by formula (1). Yield: 91.0%

Visual observation of the thus-obtained β-type crystal form azo pigment (1)-1 with a transmission microscope (manufactured by JEOL Ltd.; JEM-1010; electron microscope) reveals that the length of the long axis of primary particles is about 150 nm.

Figure 10:
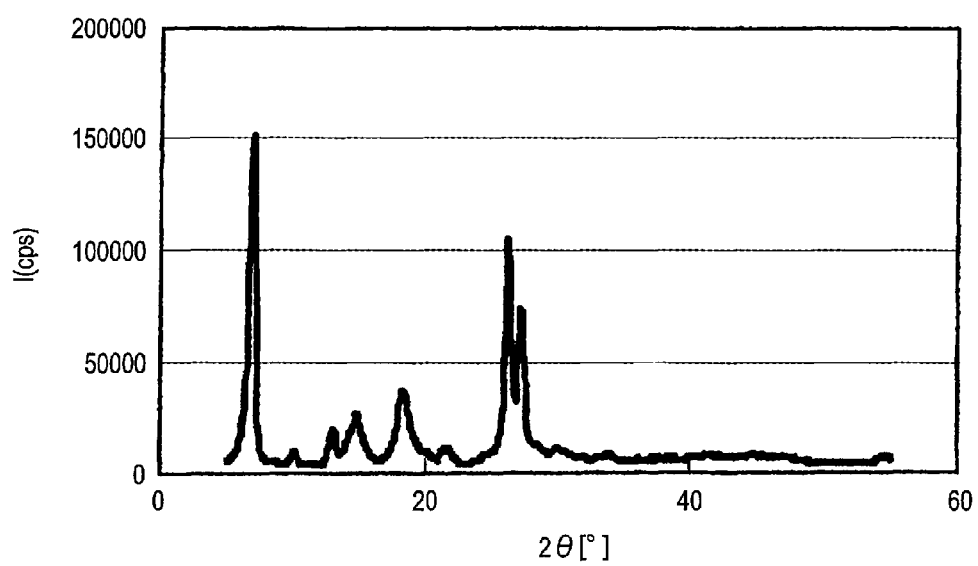
FIG. 10 is an X-ray diffraction pattern of a β-type crystal form azo pigment (1)-1 synthesized according to Synthesis Example 2.

When X-ray diffraction of the β-type crystal form azo pigment (1)-1 is measured under the aforesaid conditions, characteristic X-ray peaks are shown at Bragg angles) (2θ±0.2°) of 7.0°, 26.4°, and 27.3°. The X-ray diffraction pattern with characteristic Cu Kα line is shown in FIG. 10.

Synthesis Example 3-1

Synthesis of γ-Type Crystal Form Azo Pigment (1)-1

9.2 g of the intermediate (b) obtained in the above-described Synthesis Example 1-1 is dissolved in a mixed solution of 55 mL of acetic acid and 37 mL of propionic acid at room temperature. The resulting solution is cooled with ice to an internal temperature of −3° C., and a 40% by weight solution of nitrosylsulfuric acid in sulfuric acid is dropwise added thereto over 10 minutes at an internal temperature of −3° C. to 4° C. After stirring the mixture at an internal temperature of 4° C. for 1 hour, 0.2 g of urea is added thereto. Thereafter, the mixture is cooled to an internal temperature of −3° C., followed by stirring for further 10 minutes to obtain a diazonium salt solution. Separately, 11.1 g of the intermediate (d) obtained in the above-described Synthesis Example 1-1 is completely dissolved in 160 mL of acetone, and the solution is cooled to an internal temperature of 17° C. and added to the above-described diazonium salt solution over 25 minutes at an internal temperature ranging from −3° C. to 3° C. After completion of the addition, the mixture is stirred at 3° C. for 30 minutes, and the ice bath is removed to allow the temperature of the mixture to rise to room temperature over 30 minutes. After stirring the mixture at room temperature for 30 minutes, crystals obtained are collected by filtration, spray washed with 150 mL of acetone, then with 100 mL of water. Crystals obtained are suspended in 400 mL of water without drying, and a 8N potassium hydroxide aqueous solution is added thereto to adjust the pH to 6.7. After stirring the mixture at room temperature for 25 minutes, crystals obtained are collected by filtration, sufficiently spray washed with water, then with 80 mL of acetone. The thus-obtained crude pigment (1)-1 is dried at room temperature for 12 hours.

The thus-obtained crude pigment (1)-1 is suspended in 500 mL of acetone, followed by stirring for 30 minutes under reflux. Thereafter, the mixture is cooled to room temperature over 10 minutes, and crystals obtained are collected by filtration and dried at room temperature for 5 hours to obtain 17.4 g of γ-type crystal form azo pigment (1)-1 having the crystal form of the invention and represented by formula (1). Yield: 81.0%

Visual observation of the thus-obtained γ-type crystal form azo pigment (1)-1 with a transmission microscope (manufactured by JEOL Ltd.; JEM-1010; electron microscope) reveals that the length of the long axis of primary particles is about 0.3 μm.

Figure 11:
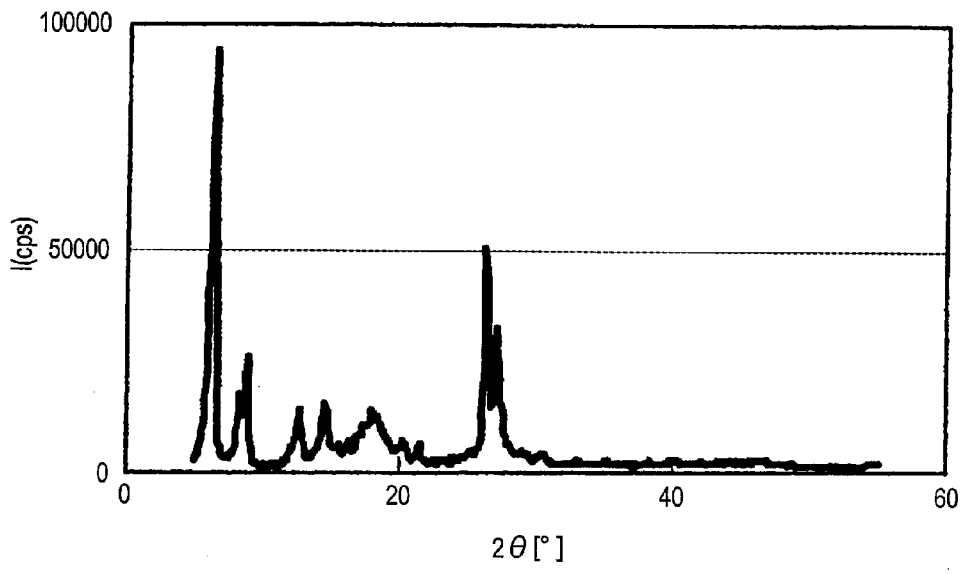
FIG. 11 is an X-ray diffraction pattern of a γ-type crystal form azo pigment (1)-1 synthesized according to Synthesis Example 3-1.

When X-ray diffraction of the γ-type crystal form azo pigment (1)-1 is measured under the aforesaid conditions, characteristic X-ray peaks are shown at Bragg angles) (2θ±0.2°) of 6.4°, 26.4°, and 27.2°. The X-ray diffraction pattern with characteristic Cu Kα line is shown in FIG. 11.

Synthesis Example 3-2

Synthesis of γ-Type Crystal Form Azo Pigment (1)-2

The crude pigment (1)-1 obtained in Synthesis Example 3-1 is suspended in 500 mL of 2-methyl-1-propanol, followed by stirring for 2 hours at an internal temperature of 80° C. Thereafter, the mixture is cooled to room temperature over 10 minutes, and crystals obtained are collected by filtration and dried at room temperature for 12 hours to obtain 19.4 g of γ-type crystal form azo pigment (1)-2 having the crystal form of the invention and represented by formula (1). Yield: 90.3%

Visual observation of the thus-obtained γ-type crystal form azo pigment (1)-2 under a transmission microscope (manufactured by JEOL Ltd.; JEM-1010; electron microscope) reveals that the length of the long axis of primary particles is about 0.2 μm.

Figure 12:
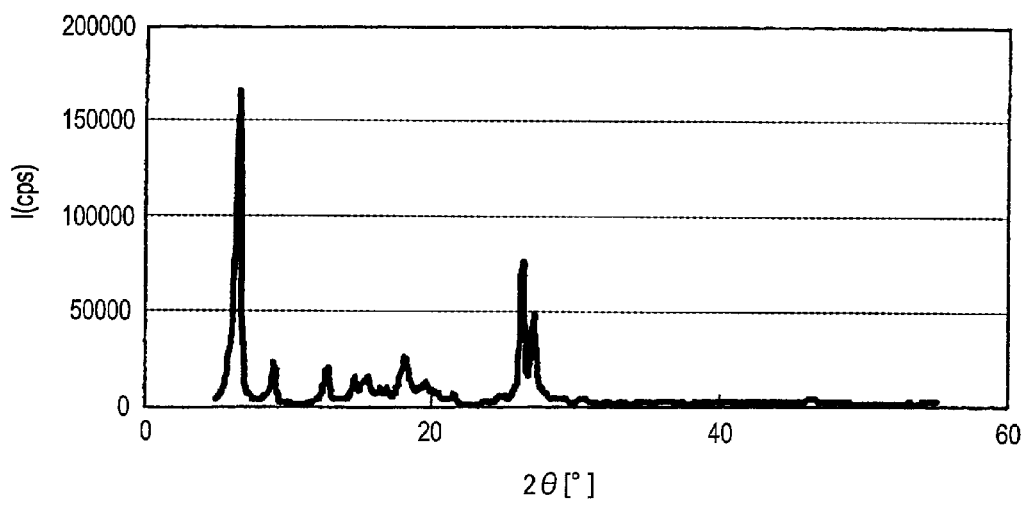
FIG. 12 is an X-ray diffraction pattern of a γ-type crystal form azo pigment (1)-2 synthesized according to Synthesis Example 3-2.

When X-ray diffraction of the γ-type crystal form azo pigment (1)-1 is measured under the aforesaid conditions, characteristic X-ray peaks are shown at Bragg angles) (2θ±0.2°) of 6.4°, 26.4°, and 27.2°. The X-ray diffraction pattern with characteristic Cu Kα line is shown in FIG. 12.

Example 1

Preparation of Pigment Dispersion 1

2.5 parts of the α-type crystal form azo pigment (1)-1 synthesized in Synthesis Example 1-1, 0.5 part of sodium oleate, 5 parts of glycerin, and 42 parts of water are mixed with each other, followed by dispersing for 1 hour at a speed of 300 rotations per minute using a planetary ball mill containing 100 parts of zirconia beads of 0.1 mm in diameter. After completion of the dispersing procedure, the zirconia beads are removed to obtain a yellow pigment dispersion 1 (volume-average particle size: Mv=ca. 67 nm; measured by using Nanotrac 150 (UPA-EX150 manufactured by Nikkiso Co., Ltd.).

Example 2

Preparation of Pigment Dispersion 2

2.5 parts of the β-type crystal form azo pigment (1)-1 synthesized in Synthesis Example 2-1, 0.5 part of sodium oleate, 5 parts of glycerin, and 42 parts of water are mixed with each other, followed by dispersing for 3 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 2 (volume-average particle size: Mv=ca. 48 nm; measured by using Nanotrac 150 (UPA-EX150 manufactured by Nikkiso Co., Ltd.).

Example 3

Preparation of Pigment Dispersion 3

2.5 parts of the γ-type crystal form azo pigment (1) synthesized in Synthesis Example 3-1, 0.5 part of sodium oleate, 5 parts of glycerin, and 42 parts of water are mixed with each other, followed by dispersing for 3 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 3 (volume-average particle size: Mv=ca. 53 nm; measured by using Nanotrac 150 (UPA-EX150 manufactured by Nikkiso Co., Ltd.).

Example 4

Preparation of Pigment Dispersion 4

2.5 parts of the α-type crystal form azo pigment (1)-1 synthesized in Synthesis Example 1-1, 0.5 part of sodium oleate, 5 parts of glycerin, and 42 parts of water are mixed with each other, followed by dispersing for 3 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 4 (volume-average particle size: Mv=ca. 31 nm; measured by using Nanotrac 150 (UPA-EX150 manufactured by Nikkiso Co., Ltd.).

Example 5

Preparation of Pigment Dispersion 5

2.5 parts of the α-type crystal form azo pigment (1)-1 synthesized in Synthesis Example 1-1, 0.5 part of sodium oleate, 5 parts of glycerin, and 42 parts of water are mixed with each other, followed by dispersing for 6 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 5 (volume-average particle size: Mv=ca. 15 nm; measured by using Nanotrac 150 (UPA-EX150 manufactured by Nikkiso Co., Ltd.).

Example 6

Preparation of Pigment Dispersion 6

2.5 parts of the α-type crystal form azo pigment (1)-1 synthesized in Synthesis Example 1-1, 0.5 part of sodium oleate, 5 parts of glycerin, and 42 parts of water are mixed with each other, followed by dispersing for 1 hour at a speed of 300 rotations per minute using a planetary ball mill containing 100 parts of zirconia beads of 0.1 mm in diameter. After completion of the dispersing procedure, the zirconia beads are removed to obtain a yellow pigment dispersion 6 (volume-average particle size: Mv=ca. 99 nm; measured by using Nanotrac 150 (UPA-EX150 manufactured by Nikkiso Co., Ltd.).

Example 7

Preparation of Pigment Dispersion 7

2.5 parts of the α-type crystal form azo pigment (1)-2 synthesized in Synthesis Example 1-2, 0.5 part of sodium oleate, 5 parts of glycerin, and 42 parts of water are mixed with each other, followed by dispersing for 2 hours at a speed of 300 rotations per minute using a planetary ball mill containing 100 parts of zirconia beads of 0.1 mm in diameter. After completion of the dispersing procedure, the zirconia beads are removed to obtain a yellow pigment dispersion 7 (volume-average particle size: Mv=ca. 85 nm; measured by using Nanotrac 150 (UPA-EX150 manufactured by Nikkiso Co., Ltd.).

Comparative Example 1

Preparation of Comparative Pigment Dispersion 1

A yellow comparative pigment dispersion 1 is obtained in the same manner as in Example 1 except for using C.I. Pigment Yellow 155 (INKJET YELLOW 4G VP2532 manufactured by Clariant Co.) in place of the α-type crystal form azo pigment composition (1) used in Example 1.

Comparative Example 2

Preparation of Comparative Pigment Dispersion 2

When the same dispersing procedures as in Example 1 are conducted except for using a compound (DYE-1) represented by the following formula in place of the α-type crystal form azo pigment (1)-1, the compound is dissolved, with failing to provide comparative pigment dispersion 2.

Comparative Example 3

A yellow comparative pigment dispersion 3 is obtained in the same manner as in Example 3 except for using C.I. Pigment Yellow 74 (Iralite YELLOW GO manufactured by BASF SE.) in place of the α-type crystal form azo pigment (1)-1 used in Example 3.

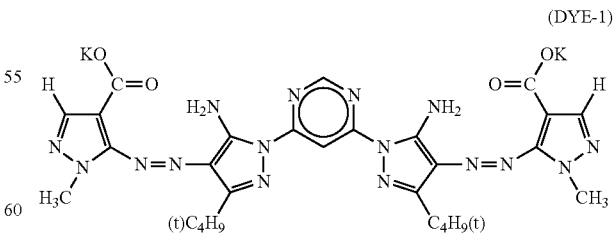

(DYE-1)

<Dispersibility>

2.5 parts of a pigment, 0.5 part of sodium oleate, 5 parts of glycerin, and 42 parts of water are mixed with each other, followed by dispersing for 2 hours at a speed of 300 rotations per minute using a planetary ball mill containing 100 parts of zirconia beads of 0.1 mm in diameter. After this dispersing procedure, the pigment dispersion 1, comparative pigment dispersion 1, and DYE-1 are evaluated according to the following criteria: a sample found to contain almost no coarse particles of 100 nm or larger is ranked A, a sample found to contain coarse particles of 100 nm or larger is ranked B, and a sample which is unable to be dispersed due to dissolution, gelation, or the like is ranked C. The results are shown in Table 1.
<Pigment Dispersion Stability>

The pigment dispersions obtained in the above-described Examples 1, 4 to 7, and Comparative Example 1 are allowed to stand at room temperature for 3 weeks. As a result, a sample which is found to form no precipitate of coarse particles is ranked A, and a sample which is found to form a precipitate is ranked B. The results are shown in Table 1.
<Evaluation of Hue>

Hue is evaluated according to the following criteria: a sample of the above-obtained coated product which is less reddish and have large vividness in terms of chromaticity when viewed with the eye are ranked A (good); a sample which is reddish or have less vividness is ranked B; and a sample which is reddish and have less vividness are ranked C (bad). The results are shown in Table 1.

of 100 nm or larger is ranked B, and a sample which is found to contain almost no coarse particles is ranked A. The results are shown in Table 2.
<Stability of Pigment Dispersions>

The pigment dispersions obtained in the above-described Example 2 and Comparative Example 1 are allowed to stand at room temperature for 3 weeks. As a result, a sample which is found to form a precipitate is ranked B, and a sample which is found to form no precipitate is ranked A. The results are shown in Table 2.

TABLE 2

|  | Tinctorial Strength | Dispersibility | Dispersion Stability of Pigment Dispersions |
|---|---|---|---|
| Present invention (pigment dispersion 2) | A | A | A |
| P.Y.155 (Comparative pigment dispersion 1) | B | B | A |
| DYE-1 | — | C | — |

<Evaluation of Solvent Resistance>

Evaluation is conducted on each of the solutions obtained by adding 0.05 part of the compound used in Example 3 and

TABLE 1

|  | Dispersibility for 2 hr | Mv (nm) of Final Dispersion | Dispersion Stability of Pigment Dispersion (at r.t., for 3 w) | Hue | After-treatment upon Synthesis of Pigment |
|---|---|---|---|---|---|
| Present invention (pigment dispersion 1) | A | 67 | A | A | conducted |
| Present invention (pigment dispersion 4) | A | 31 | A | A | conducted |
| Present invention (pigment dispersion 5) | A | 15 | A | A | conducted |
| Present invention (pigment dispersion 6) | A | 99 | A | A | conducted |
| Present invention (pigment dispersion 7) | A | 85 | A | A | not conducted |
| Comparative pigment dispersion 1 (P.Y.155) | B | >200 | B | B | — |
| DYE-1 | C | — | — | — | — |

<Evaluation of Tinctorial Strength>

Each of the pigment dispersions obtained in the above-described Example 2 and Comparative Example 1 are coated on Epson Photo Matte Paper using a No. 3 bar coater. Image density of each of the thus-obtained coated products is measured by means of a reflection densitometer (X-Rite 938; manufactured by X-Rite Co.). "Tinctorial strength (OD: Optical Density)" is evaluated according to the following criteria: a sample showing an OD of 1.4 or more is ranked A; a sample showing an OD of 1.2 or more and less than 1.4 is ranked B, and a sample showing an OD less than 1.2 is ranked C. The results are shown in Table 2.
<Dispersibility>

2.5 parts of a pigment, 0.5 part of sodium oleate, 5 parts of glycerin, and 42 parts of water are mixed with each other, followed by dispersing for 3 hours at a speed of 300 rotations per minute using a planetary ball mill containing 100 parts of zirconia beads of 0.1 mm in diameter. After this dispersing procedure, the pigment dispersion 2 and comparative pigment dispersion 1 are evaluated according to the following criteria: a sample which is dissolved in an aqueous solvent or which fails to be dispersed due to gelation of the dispersion is ranked C, a sample which is found to contain coarse particles Comparative Example 3, respectively, to 200 parts of an organic solvent, and then allowing to stand at room temperature for 24 hours. The samples are evaluated according to the following criteria: a sample with which the compound of Example or Comparative Example is completely dissolved is ranked D, a sample which is not completely dissolved, leaving insolubles, and a filtrate of which is colored is ranked C, a sample which is not completely dissolved, and a filtrate of which is slightly colored is ranked B, and a sample which leaves insolubles, and a filtrate of which is colorless is ranked A. Additionally, as the organic solvent, a mixture of 4 kinds of solvents, i.e., 25 parts of methanol, 25 parts of acetone, 25 parts of ethyl acetate, and 25 parts of water, is used.
<Dispersibility>

2.5 parts of a pigment, 0.5 part of sodium oleate, 5 parts of glycerin, and 42 parts of water are mixed with each other, followed by dispersing for 3 hours at a speed of 300 rotations per minute using a planetary ball mill containing 100 parts of zirconia beads of 0.1 mm in diameter. After this dispersing procedure, the pigment dispersion 2 and comparative pigment dispersion 1 are evaluated according to the following criteria: a sample which is dissolved in an aqueous solvent or which fails to be dispersed due to gelation of the dispersion is ranked C, a sample which is found to contain coarse particles of 100 nm or larger is ranked B, and a sample which is found to contain almost no coarse particles is ranked A. The results are shown in Table 3.

<Stability of Pigment Dispersions>

The pigment dispersions obtained in the above-described Example 3 and Comparative Example 3 are allowed to stand at room temperature for 3 weeks. As a result, a sample which is found to form a precipitate is ranked B, and a sample which is found to form no precipitate is ranked A. The results are shown in Table 3.

TABLE 3

|  | Solvent Resistance | Dispersibility | Dispersion Stability of Pigment Dispersions |
|---|---|---|---|
| Present invention (pigment dispersion 3) | A | A | A |
| P.Y.74 (Comparative pigment dispersion 3) | B | A | A |
| DYE-1 | — | C | — |

INDUSTRIAL APPLICABILITY

According to the present invention, there is provided an azo pigment having excellent coloring characteristics such as tinctorial strength and hue and having excellent dispersibility and dispersion stability. A pigment dispersion excellent in coloring properties, dispersibility, and dispersion stability is obtained by dispersing the pigment of the invention in various media. The pigment dispersion can be used for an ink for printing such as inkjet printing, a color toner for electrophotography, a color filter to be used for displays such as LCD and PDP, and photographing devices such as CCD, a paint, and in colored plastics.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Sep. 29, 2008 (Japanese Patent Application No. 2008-251880), a Japanese patent application filed on Sep. 29, 2008 (Japanese Patent Application No. 2008-251881), a Japanese patent application filed on Sep. 29, 2008 (Japanese Patent Application No. 2008-251882), and a Japanese patent application filed on Sep. 28, 2009 (Japanese Patent Application No. 2009-223193), and the contents thereof are incorporated herein by reference.

The invention claimed is:

1. An azo pigment selected from the group consisting of an azo pigment represented by the following formula (1), which has characteristic peaks at Bragg angles ($2\theta \pm 0.2°$) of 7.6° and 25.6° in X-ray diffraction with characteristic Cu Kα line, or a tautomer thereof, an azo pigment represented by the following formula (1), which has characteristic peaks at Bragg angles ($2\theta \pm 0.2°$) of 7.0°, 26.4° and 27.3° in X-ray diffraction with characteristic Cu Kα line, or a tautomer thereof, and an azo pigment represented by the following formula (1), which has characteristic peaks at Bragg angles ($2\theta \pm 0.2°$) of 6.4°, 26.4° and 27.2° in X-ray diffraction with characteristic Cu Kα line, or a tautomer thereof:

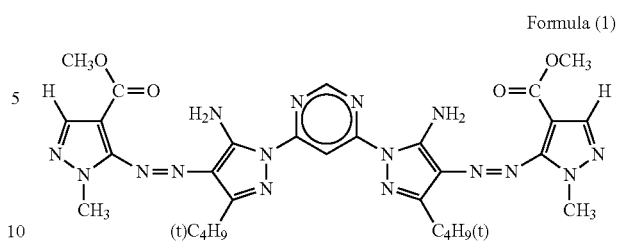

Formula (1)

2. A process for producing an azo pigment represented by the following formula (1) or a tautomer thereof, comprising: conducting diazo coupling reaction between a diazonium salt derived from a heterocyclic amine represented by the following formula (2) and a compound represented by the following formula (3):

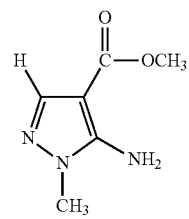

Formula (2)

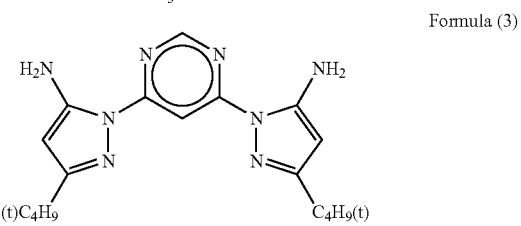

Formula (3)

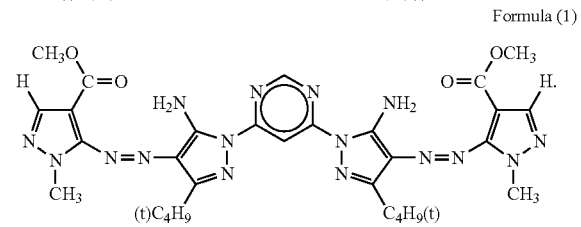

Formula (1)

3. The production process according to claim 2, further comprising successively conducting after-treatment without isolating the azo pigment obtained by the production process according to claim 2.

4. An azo pigment selected from the group consisting of an azo pigment represented by the following formula (1), which has characteristic peaks at Bragg angles ($2\theta \pm 0.2°$) of 7.6° and 25.6° in X-ray diffraction with characteristic Cu Kα line, or a tautomer thereof, an azo pigment represented by the following formula (1), which has characteristic peaks at Bragg angles ($2\theta \pm 0.2°$) of 7.0°, 26.4° and 27.3° in X-ray diffraction with characteristic Cu Kα line, or a tautomer thereof, and an azo pigment represented by the following formula (1), which has characteristic peaks at Bragg angles ($2\theta \pm 0.2°$) of 6.4°, 26.4° and 27.2° in X-ray diffraction with characteristic Cu Kα line, or a tautomer thereof:

Formula (1)

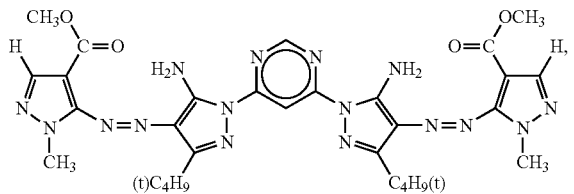

which is produced by the production process of claim 2.

5. A pigment dispersion which comprises the azo pigment according to claim 1.

6. The pigment dispersion according to claim 5, wherein the azo pigment in the pigment composition has a volume-average particle size of from 0.01 µm to 0.1 µm.

7. A coloring composition comprising the azo pigment according to claim 1.

8. The azo pigment according to claim 1, which is the azo pigment represented by the formula (1), which has characteristic peaks at Bragg angles (2θ±0.2° of 7.6°) and 25.6° in X-ray diffraction with characteristic CU Kα line, or a tautomer thereof.

9. A coloring composition comprising the azo pigment dispersion according to claim 5.

* * * * *